United States Patent
Triandopoulos et al.

(10) Patent No.: US 10,735,403 B1
(45) Date of Patent: *Aug. 4, 2020

(54) CHAFF PASSWORD GENERATION BASED ON DISTRIBUTION-BASED MODIFICATIONS OF BASE PASSWORDS

(71) Applicant: EMC IP Holding Company LLC, Hopkinton, MA (US)

(72) Inventors: Nikolaos Triandopoulos, Arlington, MA (US); Kevin Bowers, Melrose, MA (US); Ari Juels, Brookline, MA (US); Ronald Rivest, Arlington, MA (US); Guoying Luo, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/800,635

(22) Filed: Nov. 1, 2017

Related U.S. Application Data

(60) Division of application No. 14/502,053, filed on Sep. 30, 2014, now Pat. No. 9,843,574, which is a continuation-in-part of application No. 13/795,801, filed on Mar. 12, 2013, now Pat. No. 9,037,858.

(60) Provisional application No. 61/909,696, filed on Nov. 27, 2013.

(51) Int. Cl.
*G06F 21/46* (2013.01)
*H04L 29/06* (2006.01)

(52) U.S. Cl.
CPC .................... *H04L 63/083* (2013.01)

(58) Field of Classification Search
CPC ..... H04L 63/08; H04L 63/0428; H04L 63/10; H04L 63/083; G06F 21/30
See application file for complete search history.

(56) References Cited

U.S. PATENT DOCUMENTS

| 2009/0164456 | A1  | 6/2009 | Slaney |
| 2012/0042364 | A1* | 2/2012 | Hebert ................... G06F 21/46 726/6 |

OTHER PUBLICATIONS

Bojinov et al. Kamouflage: Loss-Resistant Password Management, in ESORICS, pp. 286-302, 2010.
Juels, Honeywords: Making Password-Cracking Detectable, in ACM CCS, pp. 145-160, 2013.
Kontaxis et al. Sauth: Protecting User Accounts from Password Database Leaks, in ACM CCS, pp. 187-198, 2013.
Weir et al. Password Cracking using Probabilistic Context-Free Grammars, in IEEE Symp. S & P, pp. 162-175, 2009.
U.S. Appl. No. 13/930,884, filed Jun. 28, 2013 and titled: Distributed Password-Based Authentication in a Public Key Cryptography Authentication System.

(Continued)

*Primary Examiner* — Izunna Okeke
(74) *Attorney, Agent, or Firm* — Ryan, Mason & Lewis, LLP

(57) ABSTRACT

Static and dynamic embodiments are presented for generating chaff passwords for use in a password-hardening system. Chaff passwords are generated by modifying portions of base passwords based on a distribution with which particular strings of digits and symbols appear in user passwords. Location oblivious chaff passwords are generated from a chaff set of passwords obtained from a chaff generation method by applying a random permutation over the elements of the obtained chaff set of passwords.

20 Claims, 11 Drawing Sheets

(56) References Cited

OTHER PUBLICATIONS

U.S. Appl. No. 13/905,600, filed May 30, 2013 and titled: Distributed Authentication Against Stored User Identifiers and User Templates via Pseudonym Association.
Erguler, Some Remarks on Honeyword Based Password-Cracking Detection, May 7, 2014, downloaded from http://eprint.iacr.org/2014/323.

* cited by examiner

FIG. 3

*Security Game* $\text{Game}_{\text{Gen,Statis}}(k, t)$

The adversary $\mathcal{A}$ knows the (public description of) method Gen. i.e., the chaff generation algorithm, but not its randomness with it will be invoked by challenger $\mathcal{C}$). The game is parameterized by target selection bit $t$ and proceeds as follows:

1) Adversary $\mathcal{A}$ sends to challenger $\mathcal{C}$ a *leakage* bit $\ell$.
2) For each user $i$, the challenger $\mathcal{C}$ runs the chaff generation method $\text{Gen}_k$ on input $(i, p_i, \text{aux})$. where $p_i$ is drawn from a password distribution $U_i$ that potentially meets some specified password-composition policy $P$ satisfied by set $\mathcal{P}$, to form $N$ pairs of chaff sets $W_i$ and corresponding correct indices $c(i)$, i.e., $$\{(W_i, c(i)) \leftarrow \text{Gen}_k(i, p_i, \text{aux}) | i \in [1 \quad N], p_i \xleftarrow{U_i} \mathcal{P}\}.$$

3) If $\ell = 0$, then $L = \{W_i | i \in [1 : N]\}$ else $L = \{(i, c(i)) | i \in [1 : N]\}$, and the challenger $\mathcal{C}$ sends $(L, i^*, \text{aux})$ to adversary $\mathcal{A}$ where $i^* \xleftarrow{R} [1 \quad N]$.
4) The adversary $\mathcal{A}$ outputs $(j^*, p_j^*)$, and $\mathcal{A}$ wins the game if $p_{j^*} = w_{j^*, c(j^*)}$ and:
    a) If $t = 0$, then $j^* = i^*$, i.e., $\mathcal{A}$ has succeeded in finding the real password of a random user $i^*$;
    b) If $t = 1$, then $j^* \in [1 : N]$, i.e., $\mathcal{A}$ has succeeded in finding the real password of any user $j^*$.

FIG. 4

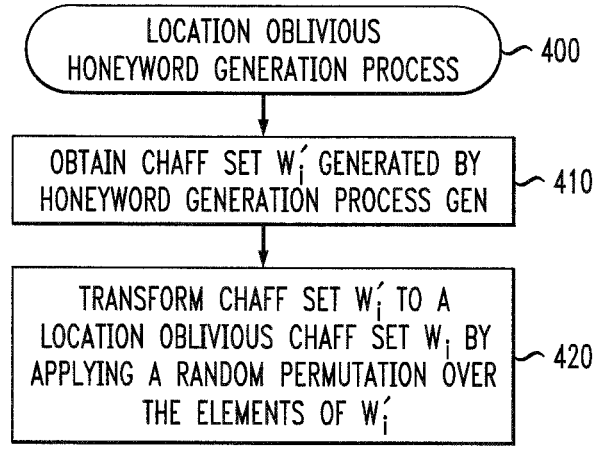

- LOCATION OBLIVIOUS HONEYWORD GENERATION PROCESS — 400
- OBTAIN CHAFF SET $W'_i$ GENERATED BY HONEYWORD GENERATION PROCESS GEN — 410
- TRANSFORM CHAFF SET $W'_i$ TO A LOCATION OBLIVIOUS CHAFF SET $W_i$ BY APPLYING A RANDOM PERMUTATION OVER THE ELEMENTS OF $W'_i$ — 420

Security Game $\text{Game}_{\text{Gen, Dyn}}(k)$

Same setting as in game $\text{Game}_{\text{Gen, Static}}(k, t)$.

The game proceeds as follows:
1) Set $t = 1$, $E = \text{FALSE}$.
    2) While $\neg E$ do:

a) For each user $i \in \mathcal{U}_t$, $|\mathcal{U}_t| = N_t$, the challenger $\mathcal{C}$ runs $\text{Gen}_k$ on input $(i, p_i, \text{aux}_t)$, where $p_i$ is drawn from a password distribution $U_i$ according to password-composition policy $P$, to form $N_t$ pairs of chaff sets $W_i^t$ and correct indices $c^t(i)$.
    b) The challenger $\mathcal{C}$ set $L^t = \{W_i^t \mid i \in [1 : N_t]\}$ and sends $(L_t, \text{aux}_t)$ to adversary $\mathcal{A}$.
    c) The challenger $\mathcal{C}$ updates set $\mathcal{U}_t$ to new set $\mathcal{U}_{t+1}$ where some old users are removed and some new users are inserted, and sets $t \leftarrow t + 1$.
    d) The adversary $\mathcal{A}$ possibly sets $E \leftarrow \text{TRUE}$.
3) The adversary $\mathcal{A}$ outputs $(j^*, p_{j^*})$, and $\mathcal{A}$ wins the game if $p_{j^*} = w_{j^*, c(j^*)}^{t^*}$ and $j^* \in [1 : N_t^*]$ for some $t^* \geq 1$, i.e., $\mathcal{A}$ has succeeded in finding the real password of $any$ user $j^*$ (who has even been inserted in the system).

| DATA TYPE | SYMBOLS | EXAMPLES |
|---|---|---|
| (A) ALPHA STRING | (A-Z)*(a-z)* | STRIKE |
| (D) DIGIT STRING | (0-9)+ | 007 |
| (O) OTHER STRING | !@#$%^&*()-_=+[]{};:'",<>? | $$ |
| (K) KEYBOARD STRING | US KEYBOARD LAYOUT | 1qaz |
| CASE MASK | CAPITALIZATION | $U_1L_5$ |

FIG. 7
700

| DATA TYPE | SYMBOLS | EXAMPLES |
|---|---|---|
| (A) ALPHA STRING | (a-z)+ | strike |
| (C) CAPITALIZATION STRING | (A-Z)+(a-z)* | STRIKE |
| (D) DIGIT STRING | (0-9)+ | 007 |
| (O) OTHER STRING | !@#$%^&*()-_=+[]{};:'",<>? | $$ |
| (K) KEYBOARD STRING | US KEYBOARD LAYOUT | 1qaz |
| (X) CONTEXT-SENSITIVE STRING | MANUALLY SPECIFIED | <3, #1 |
| REPLACEMENT MASK | MAPPING OF CHARACTERS TO REPLACEMENTS | $t \rightarrow 7, a \rightarrow @$ |
| CASE MASK | POSITION AND NUMBER OF CAPITALIZATION | strike(U1L5) $\rightarrow$ Strike |

Chaff generation method Gen$_{\text{NonSyn}}$ static case:

1) Input: Parameter $k$ (the size of the chaff sets), a set of users $\mathcal{U}$ and a set of passwords $\mathcal{P}$, where $\mathcal{P}$ is ordered as to be in one-to-one correct correspondence with a fixed ordering of $\mathcal{U}$. That is, $\mathcal{U} = (u_1, u_2, ..., u_N)$, $\mathcal{P} = (p_1, p_2, ..., p_N)$ and $p_i$ is the password of user $u_i$.
2) Initialization: An empty (disconnected) bipartite graph $G(V, V', E)$, $E = \emptyset$, is initialized.
3) Real-password inclusion: For any user $u_i \in \mathcal{U}$, edge $(v_i, v'_{\pi(i)})$ is included in $E$.
4) Random chaffing: For any user $u_i \in \mathcal{U}$, a random set of $k-1$ edges $E_i = \{(v_i, v'_{\pi(j)}) | j \in I_i\}$ where set of indices $I_i$ is formed by randomly selecting without repetition $k-1$ elements from set $[1:N] - \{i\}$.
5) Output: Output the set of correct indices $I = \{(i, \pi(i)) | u_i \in \mathcal{U}\}$. (Equivalently, output permutation $\pi$.)

FIG. 12

Chaff generation method $\text{Gen}_{\text{NonSyn}}$ dynamic case:

1) Input: A new epoch $t$, a new user record $(N+1, u_{N+1}, p_{N+1})$, $k-1$ user new records
$$R = ((\ell_1, u_{\ell_1}, p'_{\ell_1}),...,(\ell_{k-1}, u_{\ell_{k-1}}, p'_{\ell_{k-1}})),$$
$\ell_1 < ... < \ell_{k-1}$, and their corresponding correct indices
$$C = ((\ell_1, c(\ell_1)),...,(\ell_{k-1}, c(\ell_{k-1}))).$$

2) Graph update: Update $\mathcal{U}_{t-1} = (u_1, u_2,..., u_N)$ with new users set $\mathcal{U}_t = (u_1, u_2,..., u_N, u_{N+1})$, where $u_{N+1}$ is the new user that is inserted in the system. Update $\mathcal{P}_{t-1} = (p_1, p_2,..., p_N)$ with new password set $\mathcal{P}_t = (p_1, p_2,..., p_N, p_{N+1})$, where $p_{N+1}$ is the password of the new user $u_{N+1}$. Update $S_{t-1}$ to $S_t$ as follows:

a) User's addition: $V_{t-1}$ is updated to $V_t = V_{t-1} \cup \{v_{N+1}\}$, where $v_{N+1}$ is a new node associated with new user $u_{N+1}$.

b) Password addition: $V'_{t-1}$ is updated to (intermediate set of nodes) $\tilde{V}'_t = V'_{t-1} \cup \{v'_{N+1}\}$, where $v'_{N+1}$ is a new node associated with the password $p_{N+1}$.

c) Passwords replacement: For any index (existing user) $j \in \{\ell_1, \ell_2,...,\ell_{k-1}\}$, delete the old password $p_j$ associated with node $v'_{c(j)} \in \tilde{V}'$ and replace it with new password $p'_j$.

d) New chaff set: Add edge $(v_{N+1}, v'_{N+1})$ and edges $\{(v_{N+1}, v'_{c(j)}) | j \in \{\ell_1, \ell_2,...,\ell_{k-1}\}\}$ into $E_{t-1}$.

e) Chaff correction: For each $j \in \{\ell_1, \ell_2,...,\ell_{k-1}\}$, randomly select an element $v_t$ from the support set $S_{c(j)}$ of $p'_j$ satisfying that $(v_t, v'_{N+1}) \notin E_{t-1}$, remove edge $(v_t, v'_{c(j)})$ from $E_{t-1}$ and add edge $(v_t, v'_{N+1})$ into $E_{t-1}$. Set $E_t = E_{t-1}$. (If no such $v_t$ is found after a fixed number of attempts, abort with Fail.)

3) Re-randomization: Randomly select a permutation $\rho_t$ (defined over a set of size $k$), set $l_i = c(\ell_i)$, $i \in [1:k-1]$, as well as $l_k = N+1$, and transform graph $\tilde{G}(V_t, \tilde{V}'_t, E_t)$ into *isomorphic* graph $G(V_t, V'_t, E_t)$ imposed by the following *edge-preserving bijection* defined over nodes in $\tilde{V}'_t$:
   - node $v'_j \in \tilde{V}'_t$ is mapped to node $v'_{f(j)} \in V'_t$, where
   - $f(j) = l_{\rho_t(i)}$ if $j = l_i$, $i \in [1:k]$, or
   - $f(j) = j$ otherwise.

4) Output: Update the set of correct indices $I_{t-1}$ to set $I_t$ by replacing the indices for updated users $\ell_1,...,\ell_{k-1}$ and $N+1$ with new indices $(\ell_1, \rho_t(c(\ell_1))),...,(\ell_{k-1}, \rho_t(c(\ell_{k-1})))$ and $(N+1, \rho_t(N+1))$ respectively.

CHAFF PASSWORD GENERATION BASED ON DISTRIBUTION-BASED MODIFICATIONS OF BASE PASSWORDS

CROSS-REFERENCE TO RELATED APPLICATION

The present application is a divisional of U.S. patent application Ser. No. 14/502,053, filed Sep. 30, 2014, (now U.S. Pat. No. 9,843,574), entitled "Methods and Apparatus for Generating Chaff Passwords for Use in a Password-Hardening Systems," which is a continuation-in-part of U.S. patent application Ser. No. 13/795,801, filed Mar. 12, 2013, (now U.S. Pat. No. 9,037,858), entitled "Distributed Cryptography Using Distinct Value Sets Each Comprising At Least One Obscured Secret Value," and claims priority to U.S. Provisional Patent Application Ser. No. 61/909,696, filed Nov. 27, 2013, entitled "Honeywords in Practice: Generating Effective Fake Passwords," each incorporated by reference herein.

In addition, the present application is related to U.S. patent application Ser. No. 13/404,737, filed Feb. 24, 2012, (now U.S. Pat. No. 9,118,661), entitled "Method and Apparatus for Authenticating a User Using Multi-Server One-Time Passcode Verification," U.S. patent application Ser. No. 14/041,150, filed Sep. 30, 2013, (now U.S. Pat. No. 9,325,499), entitled "Message Encryption and Decryption Utilizing Low-Entropy Keys," U.S. patent application Ser. No. 14/036,225, filed Sep. 25, 2013, (now U.S. Pat. No. 9,154,496) entitled, "Proactivation Methods and Apparatus for Password-Hardening Systems," and U.S. patent application Ser. No. 14/036,239, filed Sep. 25, 2013, (now U.S. Pat. No. 9,230,092), entitled "Methods and Apparatus for Obscuring a Valid Password in a Set of Passwords in a Password-Hardening System," each incorporated by reference herein.

FIELD

The field relates generally to user verification techniques, and more particularly to password-hardening systems for use in conjunction with such techniques.

BACKGROUND

In order to gain access to protected resources, users are often required to enter static passwords in order to prove their identity. Different applications, accounts or other types of protected resources associated with a given user may each require entry of a distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

Various password-hardening systems are known that attempt to alleviate this situation. For example, it is possible for a user to store multiple passwords in encrypted form in a so-called password "vault" that is protected by a master password. Nonetheless, such password-hardening systems can remain susceptible to attack. In the case of a password vault, compromise of the master password gives the attacker immediate access to multiple valid passwords stored in the vault. Similar issues arise in hashed password files and other arrangements involving storage of multiple valid passwords.

A. Juels and R. L. Rivest, "Honeywords: Making Password-Cracking Detectable," ACM CCS, 145-60 (2013) (hereinafter, "Juels and Rivest"), incorporated by reference herein, describes the use of honeywords to conceal a real password of a user (in a random position) in a password file among a number of fake or decoy passwords known as "honeywords" or chaff passwords. Together, the real password and honeywords are often called sweetwords. An attacker that steals the file but fails to distinguish the real password from the honeywords may attempt to authenticate using a honeyword, alerting the system to the theft. The effectiveness of this scheme relies on the generation of good honeywords. Honeywords must sufficiently resemble true passwords to deceive the attacker.

Thus, an important requirement for effective honeywords is that honeywords be indistinguishable from real passwords. In other words, confronted with a randomly ordered list of sweetwords, an attacker should, with high probability, be unable to identify the real password. A need therefore remains for improved techniques for generating plausible-looking honeywords that satisfy this adversarial requirement.

SUMMARY

Illustrative embodiments of the present invention include methods and apparatus for generating chaff passwords for use in a password-hardening system. Such arrangements can provide significantly enhanced security in a wide variety of different types of password-hardening systems.

In one embodiment, chaff passwords are generated by obtaining a plurality of base passwords; obtaining a distribution with which at least one of particular strings of digits and particular strings of symbols appear in user passwords, wherein the strings have a length of at least one; and generating a chaff set of passwords by modifying portions of the base passwords based on the distribution. Generally, the distribution indicates the probability that at least one of each possible string of digits of a given length and each possible string of symbols of a given length are used by users in passwords. The distribution can be approximated from a password model or obtained from a frequency analysis over a password database.

In a further embodiment, chaff passwords are generated by obtaining a chaff set of passwords generated by a chaff generation method; and generating a location oblivious chaff set of passwords by applying a random permutation $\pi$ over the elements of the obtained chaff set of passwords.

Numerous other configurations of chaff password sets and associated valid password indication information may be used.

BRIEF DESCRIPTION OF THE DRAWINGS

FIG. 3 illustrates the security of an exemplary authentication system using an exemplary adversarial security game between an adversary A and a challenger C;

FIG. 4 is a flow chart illustrating an exemplary implementation of a location oblivious honeyword generation process incorporating aspects of the present invention;

FIG. 5 illustrates the security of an exemplary authentication system using an alternate exemplary adversarial security game between an adversary A and a challenger C;

FIG. 6B is a table indicating an exemplary set of string types used by an exemplary V1 generation method that extends the V0 method presented by Juels and Rivest;

FIG. 7 is a table illustrating exemplary string types and masks used in an exemplary V2 generation method;

FIG. 11 provides exemplary pseudo code for an exemplary static implementation of a non-synthetic chaff generation method incorporating aspects of the present invention;

FIG. 12 provides exemplary pseudo code for an exemplary dynamic implementation of a non-synthetic chaff generation method incorporating aspects of the present invention.

DETAILED DESCRIPTION

Illustrative embodiments of the present invention will be described herein with reference to exemplary communication systems, password-hardening systems and associated processing devices. It is to be appreciated, however, that the invention is not restricted to use with the particular illustrative system and device configurations shown. Accordingly, the term "password-hardening system" as used herein is intended to be broadly construed, so as to encompass, for example, systems comprising only a single processing device, systems in which multiple processing devices communicate with one another over a network or other connection, and numerous other system types and configurations.

An exemplary password-hardening system and corresponding method in which the present invention may be implemented will first be discussed in conjunction with FIGS. 1 and 2, followed by a discussion of a number of different exemplary honeyword generation methods. In particular, a set of generation methods referred to as V0-V2 generation methods involve the construction of synthetic honeywords. A further generation method, referred to as the V3 generation method, generates non-synthetic honeywords. Generally, the V3 generation method recognizes that for a given user in a system, the real passwords of other users can be employed as honeywords for the given user.

Password-Hardening System

Figure 1:
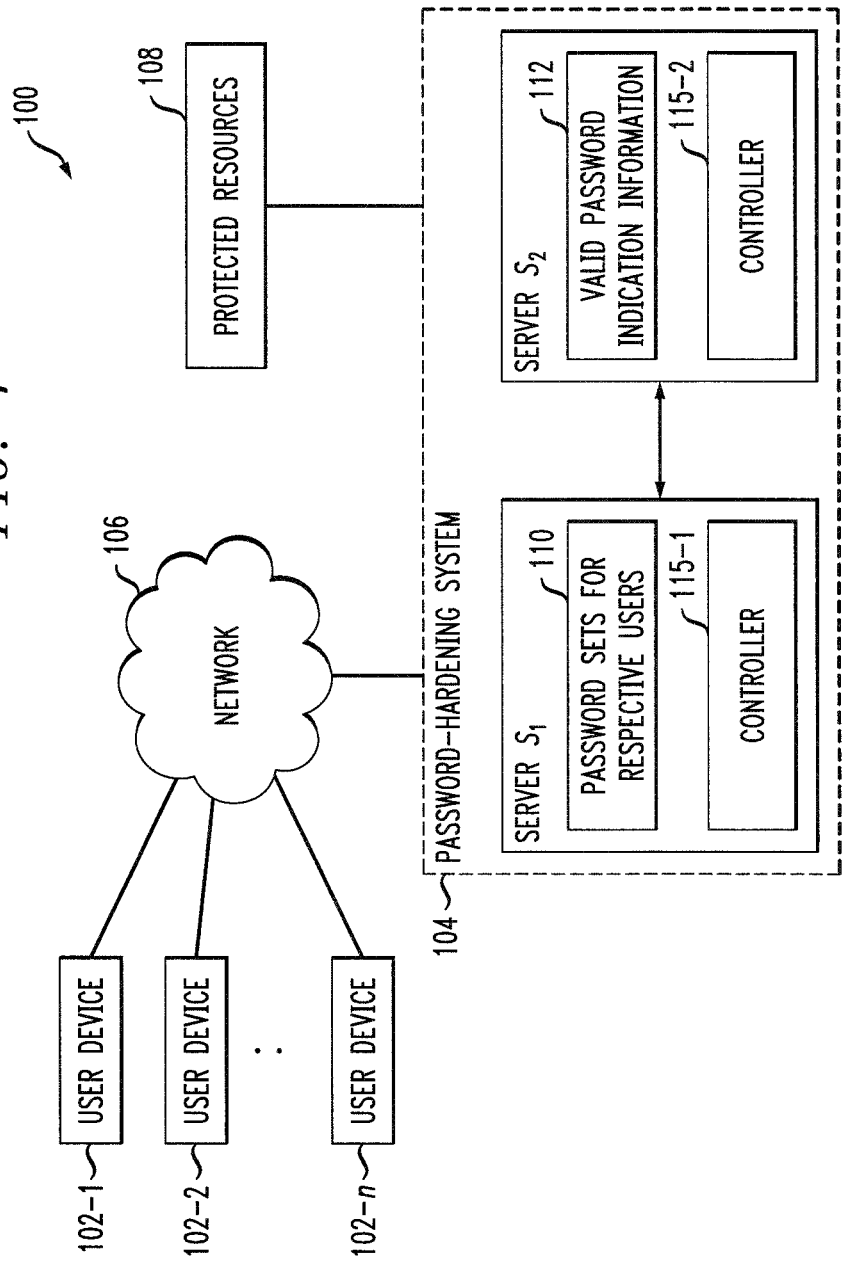
FIG. 1 is a block diagram of a communication system that includes a password-hardening system comprising first and second servers in which aspects of the invention may be implemented.

FIG. 1 shows a communication system 100 in an illustrative embodiment of the present invention. The system 100 comprises a plurality of user devices 102-1, 102-2, . . . 102-n that are configured to communicate with a password-hardening system 104 over a network 106 in order to gain access to protected resources 108. Although shown as separate from the protected resources 108 in the present embodiment, the password-hardening system 104 in other embodiments may be wholly or partially incorporated within one or more of the protected resources 108. The protected resources 108 may comprise, for example, multi-user computer systems, web sites, applications, etc. Such protected resources may reside at least in part on one or more of the user devices 102 rather than being separate from those devices as illustrated in FIG. 1.

The password-hardening system 104 comprises first and second servers $S_1$ and $S_2$. It should be understood that the particular number of servers shown in this embodiment is exemplary only. Accordingly, other embodiments may utilize a different number of servers in implementing the exemplary password-hardening system 104.

It is assumed in the present embodiment that each of the user devices 102 is able to communicate over the network 106 with at least one of the servers $S_1$ and $S_2$, although other arrangements can be used in other embodiments. For example, in some embodiments, at least some communications between the user devices 102 and one or more of the servers $S_1$ and $S_2$ may alternatively flow through one or more of the protected resources 108. In such an arrangement, at least portions of the protected resources 108 may be coupled to the network 106 and at least portions of the password-hardening system 104 may be decoupled from the network 106.

The user devices 102 may comprise, for example, mobile telephones, laptop or tablet computers, desktop computers, gaming consoles or other user devices in any combination. Each such device may be associated with a corresponding user to be subject to verification in the system 100, where "user" as the term is applied herein should be generally construed so as to encompass, for example, a human user or an associated hardware or software entity. Numerous alternative arrangements are possible.

A given user device 102 may incorporate or otherwise have associated therewith a hardware or software authentication token, although such tokens are not required in embodiments of the invention. One example of an authentication token that may be used in conjunction with user verification in some embodiments is a time-synchronous authentication token such as an RSA SecurID® user authentication token, commercially available from RSA, The Security Division of EMC Corporation, of Bedford, Mass., U.S.A. For example, personal identification numbers (PINs) or other personal identifiers typically used in conjunction with authentication tokens to implement two-factor authentication processes may be viewed as respective passwords as that term is broadly used herein. Accordingly, the term "password" as used herein should be understood to encompass any arrangement of words, phrases, numbers or other combination of characters suitable for user verification.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The first server $S_1$ is configured to store password sets 110 for respective ones of a plurality of users. In the present embodiment, it is assumed without limitation that each of user devices 102 is associated with a different user for which a corresponding password set is stored in the first server. Thus, in this embodiment, the first server $S_1$ stores n sets of passwords, one set for each of the users associated with respective ones of the devices 102. Each such set comprises at least one valid password for the corresponding user and a plurality of chaff passwords for that user. The term "chaff password" as used herein refers to a fake or decoy password that is used to make it more difficult for an attacker to determine which of the passwords in a given one of the password sets 110 is a valid password for the corresponding user. Such fake or decoy passwords may also be referred to herein as "honeywords." The term "chaff password" as used herein is intended to be broadly construed so as to encompass these and other arrangements of invalid passwords configured to deter an attacker.

The chaff passwords should be selected so as to be very difficult to distinguish from a valid password. For example, the chaff passwords may be drawn randomly from a probability distribution substantially the same as that from which the valid password is selected. References herein to "random" selection or values are intended to be broadly construed so as to also encompass pseudorandom variants. As discussed further below, aspects of the present invention provide improved techniques for generating such chaff passwords.

The second server $S_2$ is configured to generate valid password indication information 112 that indicates for each of the n password sets which of the passwords in that set is a valid password. The valid password indication information may illustratively comprise valid password index values for respective ones of the n users. Assuming without limitation that each of the it password sets includes only a single valid password arranged within a plurality of chaff passwords, the index values may simply provide respective numerical indicators of which password in each set of passwords is the single valid password.

Although the valid password indication information 112 is shown as being stored on the second server $S_2$ in the FIG. 1 embodiment, at least portions of this information may additionally or alternatively be stored on another system element, such as on a related access control system associated with one or more of the protected resources 108.

Moreover, the valid password indication information 112 may be only temporarily stored in whole or in part on the second server $S_2$ and then regenerated as needed responsive to verification requests received from the first server $S_1$ in conjunction with user submission of a password for verification.

The first and second servers $S_1$ and $S_2$ further comprise respective controllers 115-1 and 115-2 that direct the operations of their corresponding servers $S_1$ and $S_2$ to provide functionality associated with user verification as described herein. For example, the controllers 115 in the present embodiment may cooperate with one another to generate the sets of passwords 110 and the valid password indication information 112. Other functionality such as periodic proactive updating of the sets of passwords 110 and the valid password indication information 112 may also be implemented using the controllers 115. Although shown as comprising separate internal controllers 115 in the present embodiment, the servers in other embodiments may instead be associated with a single controller that may be arranged at least in part internal to a particular one of the servers, or external to both of the servers.

The servers $S_1$ and $S_2$ may be implemented, for example, as respective physically separated processing devices, possibly located in different computing systems or organizations. Alternatively, such servers may represent distinct virtual servers that may reside on the same physical infrastructure. Other types of multiple server arrangements may be used in implementing the password-hardening system 104. Accordingly, the term "server" as used herein is intended to be broadly construed.

The password sets 110 and corresponding valid password indication information 112 are assumed to be stored in respective memories of the servers $S_1$ and $S_2$. Such storage may include only partial or temporary storage of the sets 110 and associated information 112. It should be noted that the particular ordering used in the names or other descriptions herein of elements such as 110 and 112 should not be construed as requiring any particular ordering of the corresponding stored information items in an actual memory of a processing device that implements a given one of the servers.

The controllers 115 collaborate with one another to verify a given user based on a submitted password. The FIG. 1 embodiment may be viewed as an example of an embodiment in which the valid password indication information 112 is stored in its entirety in the second server $S_2$, although it is to be appreciated that other embodiments may store this information in different ways, such as in the form of a shared secret across the first and second servers $S_1$ and $S_2$. In an arrangement of the latter type, also referred to herein as a distributed arrangement for storage of the valid password indication information 112, neither of the first and second servers individually stores the complete valid password indication information.

In one possible operating configuration of the FIG. 1 embodiment, as discussed further below in conjunction with FIG. 2, a password is received from a user attempting to access one of the protected resources 108 via one of the user devices 102. The received password is initially supplied to the first server $S_1$ and a determination is made in the first server $S_1$ as to whether or not the received password is in the set of passwords stored for the user. This determination is assumed to be made by the controller 115-1. If the received password is determined to be in the set of passwords stored for the user, the password is then supplied to the second server $S_2$. A further determination is then made in the second server $S_2$ as to whether or not the received password is the valid password or one of the chaff passwords. This determination is assumed to be made by the controller 115-2. If the received password is the valid password, access to the protected resource is granted by the password-hardening system 104. However, if the received password is one of the chaff passwords, access to the protected resource is denied and an appropriate remedial action is taken in accordance with a specified policy.

For example, receipt of one of the chaff passwords in conjunction with an attempt to access a protected resource 108 may be an indication that the password set for the user has been compromised by an attacker, but the attacker has been unable to determine which of the passwords in the set is the valid password and is therefore attempting to access the protected resource using one of the chaff passwords. An appropriate remedial action in this scenario may be to reconfigure the chaff passwords and to update the password set and its associated valid password indication information.

The user devices 102, password-hardening system 104 and protected resources 108 may each be implemented using one or more processing devices. A given such processing device may comprise, for example, a computer or other type of processing device configured to communicate with other such devices over the network 106. Each such processing device generally comprises at least one processor and an associated memory, and implements one or more functional modules for controlling certain features of the communication system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "processor-readable storage media" storing executable computer program code.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Various elements of the communication system 100, such as the controllers 115-1 and 115-2 of the respective servers $S_1$ and $S_2$, may be implemented at least in part in the form of software that is stored in a memory of a processing device and executed by a processor of that processing device.

The communication system 100 in the present embodiment implements one or more processes for user verification based on submitted passwords. An example of such a process performed at least in part in conjunction with a user submitting a password for verification will be described in conjunction with FIG. 2 below, but it should be understood that numerous other types of processes may be used in other embodiments.

It is to be appreciated that the particular set of elements shown in FIG. 1 for providing user verification is presented by way of example, and in other embodiments additional or alternative elements may be used. Thus, another embodiment may include additional networks and additional user devices, servers or protected resources.

Communications among user devices, servers, protected resources and other system elements in embodiments of the invention may optionally utilize authenticated, confidential and integrity-protected channels or other types of secure channels. For example, secure channels in some embodiments may be established using techniques such as secure sockets layer (SSL) or transport layer security (TLS). Such techniques are well known in the art and therefore not described in detail herein.

As mentioned previously, various elements of system 100 such as the servers $S_1$ and $S_2$ or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 13 and 14.

The operation of the system 100 will now be described in greater detail with reference to the flow diagram of FIG. 2, which illustrates an exemplary set of operations performed by password-hardening system 104 in verifying a user responsive to a submitted password in an illustrative embodiment.

The process as shown includes steps 200 through 208, all of which are assumed to be performed by elements of the password-hardening system 104. It is to be appreciated that in other embodiments one or more such steps may be implemented at least in part by other system elements.

Figure 2:
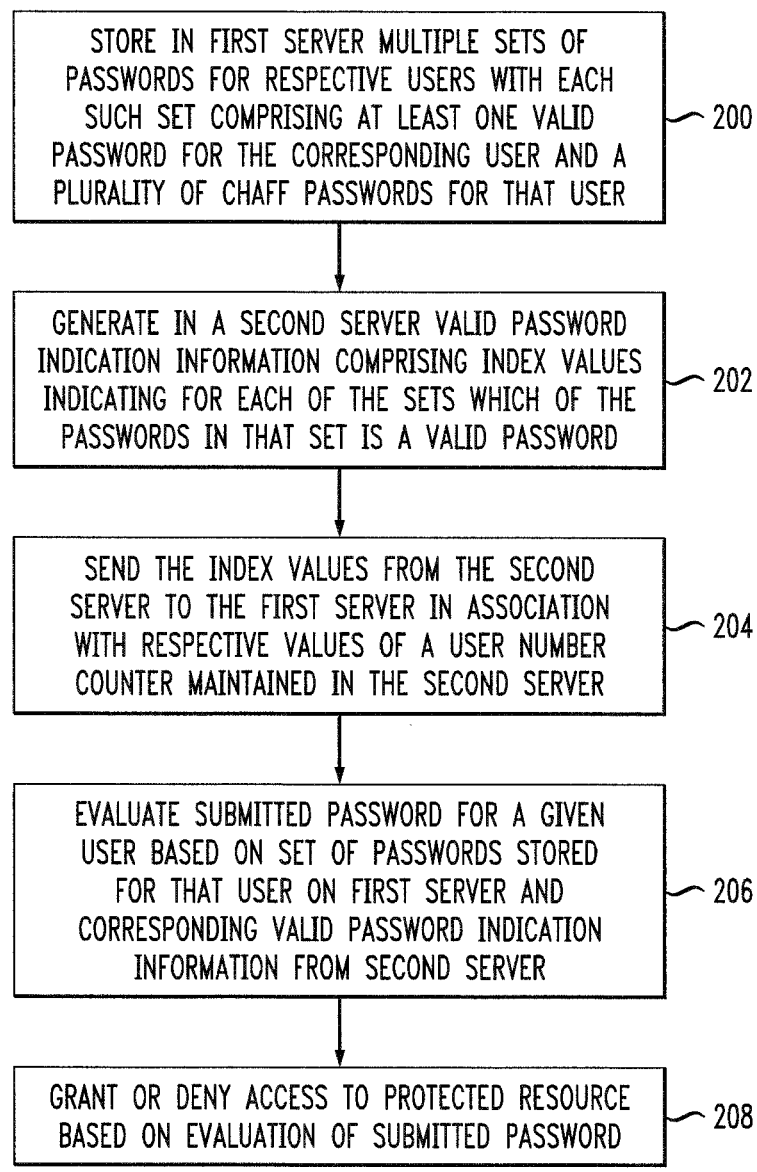
FIG. 2 is a flow chart illustrating a set of operations performed by the password-hardening system of FIG. 1 in verifying a user responsive to a submitted password in an illustrative embodiment of the invention.

As in the previous description of system 100 above, it is assumed for purposes of the illustrative process of FIG. 2 that there are n distinct users, and that the password sets 110 include n password sets, one for each of the n users, with each such set including only a single valid password and multiple chaff passwords. It is further assumed for this embodiment that the password sets 110 are stored on first server $S_1$ and that the corresponding valid password indication information 112 is stored at least in part on second server $S_2$. Thus, this embodiment encompasses arrangements in which the valid password indication information is stored in its entirety on the second server, as well as other arrangements, such as those in which the valid password indication information is stored in a distributed manner as a shared secret across the first and second servers.

In step 200, multiple sets of passwords are stored in the first server $S_1$ for respective ones of the n users with each such set comprising at least one valid password for the corresponding user and a plurality of chaff passwords for that user. The chaff passwords may be generated by the corresponding controller 115-1 possibly operating in cooperation with controller 115-2 and based on parameters characterizing a known valid password, as discussed further below.

In step 202, the second server generates valid password indication information 112 comprising index values indicating for each of the password sets which of the passwords in that set is a valid password. Again, it is assumed that only one password in each set is a valid password, but other embodiments can include multiple valid passwords in each set. Step 202 may involve, for example, storing at least portions of the valid password indication information 112 at least temporarily on the second server, as in the FIG. 1 embodiment, or storing such information in a distributed manner as a shared secret across the first and second servers.

In one exemplary implementation of step 204, the index values are sent from the second server to the first server in association with respective values of a user number counter maintained in the second server. Another embodiment is discussed further below in a section entitled "Split-Server Configuration," where the second server does not send any information to the first server. Particular examples of techniques for generating the index values and the associated user number counter values will be described in detail elsewhere herein.

Although steps 200, 202 and 204 are shown in the figure as being performed serially, this is for simplicity and clarity of illustration only, and the steps are intended to comprise arrangements in which the corresponding operations are applied first to one password set, then to a second password set and so on. Thus, for example, the password set, index value and user number may be determined for one user, and then the corresponding operations repeated in sequence for each of a plurality of additional users.

In step 206, a password submitted for a given user is evaluated based on the set of passwords stored for that user on the first server and the corresponding valid password indication information obtained from the second server. This evaluation involves collaboration between the first and second servers, as the password-hardening system 104 in the present embodiment is configured such that neither server alone can make all of the required determinations associated with evaluation of a given submitted password. As previously mentioned, controllers 115-1 and 115-2 are assumed to be utilized in this evaluation of the given submitted password. It should again be noted that the term "user" in this context and elsewhere herein should not be construed as limited to a human user, but may additionally or alternatively refer, for example, to a particular hardware or software entity.

In step 208, access to a given one of the protected resources 108 is granted or denied based on the evaluation of submitted password. Accordingly, if the submitted password is determined by the first server to be in the password set for the user and then if the submitted password is determined by the second server to correspond to the valid password of the set and not one of the chaff passwords of the set, access to the protected resource is granted and otherwise access to the protected resource is denied.

The particular processing operations and other system functionality described in conjunction with the flow diagram of FIG. 2 are presented by way of illustrative example only, and should not be construed as limiting the scope of the invention in any way. Alternative embodiments can use other types of processing operations for user verification using stored password sets and associated valid password indication information. For example, the ordering of the process steps may be varied in other embodiments, or certain steps may be performed concurrently with one another rather than serially.

Also, alternative processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be further described herein, although alternative embodiments of the present invention may incorporate aspects of such processes.

In the two-server embodiment of FIGS. 1 and 2, neither server alone stores full information about a given user password, and therefore the password-hardening system is resilient to compromise of either of the two servers. For a more detailed discussion of suitable password-hardening systems 104, see, for example, U.S. patent application Ser. No. 14/036,239, filed Sep. 25, 2013, (now U.S. Pat. No. 9,230,092), entitled "Methods and Apparatus for Obscuring a Valid Password in a Set of Passwords in a Password-Hardening System," incorporated by reference herein.

Honeyword Generation Methods

Juels and Rivest propose two honeyword generation methods.

Chaffing-with-a-Password-Model:

A model of user password selection is built based on a lexicon of real passwords (e.g., the RockYou database of 32 million breached passwords). Honeywords are generated according to this model. As discussed further below, Juels and Rivest propose a model that probabilistically splices together substrings of passwords from the lexicon into a "frankenword."

Chaffing-by-Tweaking:

A base password (or honeyword) may be tweaked to derive a small number of similar-looking honeywords. Tweaking may involve randomization of a small set of symbols, e.g., if there is a digit in the base password, the digit may be replaced by a new, randomly selected digit. Juels and Rivest propose a tweak involving uniform random selection of a replacement.

Juels and Rivest recommend that generation methods be hybridized. Specifically, k–1 honeywords may be generated for a real password via chaffing-with-a-password-model. Then, each of these k passwords/honeywords can be tweaked l–1 times, yielding a total of kl sweetwords. Such hybridization gives a hedge against the failure of either honeyword-generation strategy. For example, if an attacker breaks the chaffing-by-tweaking generator, i.e., can distinguish tweaks from base sweetwords, there remain k viable sweetwords. The generation method of Juels and Rivest that hybridizes chaffing-with-a-password-model and chaffing-by-tweaking is referred to herein as the V0 generation method.

According to one aspect of the invention, an improved generation method, referred to as the V1 generation method, is provided. As observed by Juels and Rivest, password crackers are implicit models of user password selection that can serve to generate honeywords. The V1 generation method achieves chaffing-with-a-password-model generation by running a password cracker "in reverse." In other words, the V1 generation method generates honeywords by sampling from the probability distribution induced by a password cracker, such as the password cracker described in M. Weir et al., "Password Cracking Using Probabilistic Context-Free Grammars," IEEE Symp. S & P, 162-75 (2009) (hereinafter, M. Weir et al.), incorporated by reference herein. To perform tweaks to password substrings/symbol sets, the V1 generation method leverages an observation that users are biased toward selection of certain substrings. (For example, it has been observed that for over 50% of passwords containing a single digit, that digit is '1'). The V1 generation method uses a frequency model for replacements derived from training on a password lexicon.

According to another aspect of the invention, an alternate generation method, referred to as the V2 generation method, improves semantic sensitivity. The V2 generation method addresses the challenges of generating honeywords for semantically significant passwords. The V2 generation method recognizes that many real passwords have culturally or linguistically significant content that may distinguish them from honeywords generated using the V0 generation method or the V1 generation method. For example, Blink182 is a password in the RockYou database. Tweaking this password to yield Blink 123 would result in a bad, implausible honeyword because Blink-182 is a well known rock band.

In one exemplary implementation, the V2 generation method imbues the conventional chaffing-with-a-password-model with culturally current, semantically significant content by enriching the password lexicon used for training with Twitter hashtags. In addition, the tweaking model for the exemplary V2 generation method includes a collection of semantically significant substrings in common use. For example, the employed tweaking model is embellished to identify email addresses and maintain their structure, tweaking the mail domain rather than the numbers or symbols contained within.

Generally, the V0-V2 generation methods involve the construction of synthetic honeywords. Another aspect of the invention provides a further generation method, referred to as the V3 generation method, for the generation of non-synthetic honeywords. Generally, the V3 generation method recognizes that for a given user in a system, the real passwords of other users can be employed as honeywords for the given user. In this manner, the honeywords will originate from the same distribution as real passwords (barring correlation between usernames and passwords). While password additions and deletions potentially reveal critical information to an adversary that compromises a password file multiple times, the V3 generation method addresses this issue with techniques that batch password changes.

Yet another aspect of the invention employs an attack algorithm comprising a classifier based on a character (n-gram) based language model to evaluate whether the honeywords generated by any generation method, such as the V0-V3 generation methods, are distinguishable from real passwords.

A further aspect of the invention improves the security of honeyword systems using a disclosed permutation of the chaff set to achieve a Location Oblivious property (thereby achieving resilience to attack of either server in a multi-server setting).

Chaff Sets

Consider a password-based authentication system AS used to restrict access on some resource to a set of N users $U=\{u_1, u_2, \ldots, u_N\}$; user $u_i$ authenticates to the system by presenting his or her password $p_i$ to an authentication server. For simplicity, users are identified in AS also by indices 1, 2, ..., N, i.e., user $u_i$ is also denoted by index i.

In a chaff-based extension of such an authentication system AS, for each user $u_i$, the authentication server securely maintains a list of $k_i$ unique sweetwords or potential passwords $$W_i = (w_{i,1}, w_{i,2}, \ldots w_{i,k_i})$$

of size some fixed user-specific integer $k_i$. List $W_i$ by definition contains the real password $p_i$ of user $u_i$ at some position in $[1:k_i]$ that is denoted by c(i): that is, if $W_i$ is seen as an ordered set (or array) indexed from 1 to $k_i$, c(i) is the correct index of user $u_i$'s password $p_i$ in $W_i$. In other words, $$w_{i,c(i)} = p_i.$$

In essence, $W_i$ contains the real (correct) password of $u_i$ along with $k_i-1$ fake (incorrect) passwords, also called honeywords, chaff or decoys. For simplicity, $W_i$ may be referred to as the chaff set of user $u_i$.

Definition 1

A honeyword (or chaff) generation method Gen is an efficient probabilistic algorithm that, in addition to its (secret) randomness, takes as input an index i (describing user $u_i$), an integer $k_i$, a password $p_i$ and optionally an auxiliary input aux, and returns as output a set of sweetwords $W_i = (w_{i,1}, w_{i,2}, \ldots, w_{i,k_i})$ for user u, and a corresponding correct index c(i), where $w_{i,c(i)}$ is the user $u_i$'s real password. We write $(W_i, c(i)) \leftarrow Gen(i, k_i, p_i, aux)$.

It is noted that the real password $w_{i,c(i)}$ of the user may or may not equal the input password $p_i$; in particular, either $w_{i,c(i)} = p_i$ where Gen copies the input password, or $w_{i,c(i)} = p_i' \neq p_i$, in which case Gen modifies $p_i$. Similarly, honeywords in $W_i - \{w_{i,c(i)}\}$ may or may not depend on the input password $p_i$. In general, $W_i$ may also depend on the auxiliary input aux, which in turn may be user-independent or related to the set of users U.

For simplicity, it is assumed that a global system parameter k determines the (same) number of sweetwords for any user $u_i \in U$, i.e., $k_i = k$ for all $i \in [1:N]$, in which case method Gen is denoted by $(W_i, c(i)) \leftarrow Gen_k(i, p_i)$.

Moreover, the set of users U may evolve over time through insertions of new users or deletions of old users. Naturally, a user insertion results in invoking algorithm Gen for the new user (possibly using an updated auxiliary input aux'), whereas a user deletion from the system results in permanently deleting from the system the associated chaff set of the user that is removed from the system, along with its corresponding correct index defining this user's real password. Note that, in principle, a change in the real password of user $u_i$ can be generically supported by deleting the user from the system and re-inserting the user by invoking $(W_i, c(i)) \leftarrow Gen_k(i, p_i', aux')$ over the new password $p_i'$.

Split-Server Configuration

As described in Juels and Rivest, chaff sets can be employed in a split-server configuration of an authentication system AS, such as the system 100 shown in FIG. 1, as follows. The first authentication server $S_1$ of the system 100, where all authentication attempts take place by having the user submitting a candidate password, stores only a chaff set for each user in the system, i.e., the collection F of sets $$F = ((1, W_1), (2, W_2), \ldots, (N, W_N)),$$

but important for the security of the system 100, the first authentication server $S_1$ does not store any information about the correct indices c(i), $i \in [1:N]$. The latter is the only information stored by a second server $S_2$, called the honeychecker, in the form of N pairs $$(1, c(1)), (2, c(2)), \ldots, (N, c(N)).$$

Using this configuration, the authentication system AS operates as follows:

1. On input a candidate password p' submitted by user i, the first authentication server $S_1$ checks whether p' belongs in set $W_i$;

if not, the authentication attempt is rejected without further check;

if yes, let $p' = w_{i,j}$, i.e., p' matches the j th sweetword in the chaff set $W_i$ of user $u_i$; then the authentication server reports pair (i,j) to the honeychecker;

2. The second server $S_2$ (honeychecker), in turn, checks whether j=c(i);

if yes, the authentication attempt is accepted (the user is authenticated in the system as being user $u_i$);

if not, the authentication attempt is flagged as suspicious, namely, it is interpreted as highly indicative of a possible compromise of the authentication server.

It is noted that in this embodiment of the second server $S_2$, the second server $S_2$ need not send information back to the first server $S_1$, which is different than the embodiment of the second server $S_2$ described above in conjunction with FIG. 2. The various embodiments of the second server $S_2$ described herein are all consistent with the honeyword generation methods described herein.

In practice, the first authentication server $S_1$ is expected to maintain only hashed (and salted) passwords in the stored chaff sets of the users of the system, i.e., to store a hashed password file F consisting of hashed chaff sets:

$$F = ((1, H_1), (2, H_2), \ldots, (N, H_N)),$$

where $H_i = (v_{i,1}, v_{i,2}, \ldots, v_{i,k})$ and where $v_{i,j}$ is the hashed version of password $w_{i,j}$ (according to some appropriate slow-to-invert hash function). Hashed passwords add an extra layer of protection against server-compromise attacks, however, in what follows it is assumed that an attacker is able to invert the used hash function, at least in the large majority of the passwords.

Security Definitions

Consider an attacker that partially compromises a chaff-based authentication system AS with split-server configuration (such as that shown in FIG. 1). That is, the attacker successfully compromises either the first authentication server $S_1$ storing the users' chaff sets or the second authentication server $S_2$ storing the correct indices of real passwords in the corresponding chaff sets (but not both simultaneously).

Passive or ephemeral server compromises are considered herein, where the attacker gets full access to the internal secret state of one server, but does not actively control its interaction with the other server or the system users. Then, given such an ephemeral server compromise, the goal of the attacker is to identify the real password of one or more users in U, that is, to identify password $w_{i,c(i)}$ for one or more users i in the system.

The security of such an authentication system AS is defined using an exemplary adversarial game 300, shown in FIG. 3, played between an adversary A and a challenger C. This game 300 models the capabilities of the adversary in its attempt to break the system and learn the real passwords of users. Specifically, a generalized security game 300 is considered that captures in a unified way various attacks performed by an adversary: First, the adversary is free to select which server to attack, i.e., the adversary can choose to ephemerally compromise either the authentication server or the honeychecker; second, the game 300 is additionally parameterized to cover both single-user and multi-user attacks, i.e., it covers attacks that are both targeted against a particular user and those targeted against any user. Finally, the security game 300 is defined with respect to any chaff generation method Gen.

Let $z_0$, $z_1$ denote the expected probability of the adversary of winning the game 300 in the case where $\ell = 0$ or respectively $\ell = 1$, where this probability in taken over the users' choices of passwords $p_i$, the randomness of the chaff generation procedure Gen as well as the randomness used by the adversary A. Then, $z_0 \geq 1/k$, since A can always randomly guess password $w_{i,c(i)}$ from a given chaff set $W_i$ (independently of A's strategy on how to select i in case where t=1). Analogously, $z_1 \geq |P|$, since A can always randomly guess a password from the list of admissible (according to policy P) passwords—note, however, that this is the default probability of success of A even before entering the security game 300.

To optimize its wining probability, the adversary A will set the leakage bit $\ell$ to the one maximizing $z_l$ over $z_{1-l}$, i.e., so that $z_l > z_{1-l}$. Note that there are naive chaff-generation methods for which $z_0 < z_1$, e.g., the method $Gen_{fixed}$ that ignores any input password $p_i$ to produce a chaff set $W_i$ of predetermined (hardcoded on described by the auxiliary input) passwords and in predetermined order, where c(i) is uniformly at random set to $j \in [1:k]$, i.e., $j \xleftarrow{R} [1:k]$. In this case, $z_0 = 1/k$ whereas $z_1 = 1$, as the adversary deterministically learns the correct password $w_{i,c(i)}$ given the known $W_i$ (by the public description of $Gen_{fixed}$) and the known correct index c(i) (by the attack against the honeychecker).

In the following discussion, it is assumed that the best strategy of adversary A is to always select $\ell = 0$, i.e., that A is better off choosing to learn the chaff sets leak rather than the correct indices. Definition 2 formally characterize a sufficient, but perhaps not necessary, condition for a chaff-generation method to be more susceptible to attacks through leakage of the chaff sets, that is, for $z_0 > z_1$ to hold.

Definition 2

A chaff generation method Gen producing chaff set W of size k is called location oblivious, if the probability that any sweetword $w \in W$ lies at position i, $i \in [1:k]$, in any fixed ordering of W is exactly 1/k.

FIG. 4 is a flow chart illustrating an exemplary implementation of a Location Oblivious Honeyword Generation Process 400 incorporating aspects of the present invention. As shown in FIG. 4, an aspect of the invention recognizes that any chaff generation method Gen producing chaff set $W_i'$ (obtained during step 410) can be transformed to a location oblivious chaff set $W_i$ by applying a random permutation $\pi$ over the elements of $W_i'$ during step 420. Note that the location oblivious extension of the naive chaff generation method $Gen_{fixed}$ of the contrived example above results in a new method $Gen_{fixed}'$ for which $z_0 = z_1 = 1/k$. Therefore, without loss of generality, chaff generation methods that are location oblivious are considered herein; for such methods, selecting $\ell = 0$, i.e., leakage of the chaff set, is always a preferable adversarial strategy.

Thus far, only the static case has been considered, where the set of users in the authentication system AS is static. In a natural extension of the security game 300, the adversary observes a series of leaked chaff sets corresponding to different states of the authentication system resulted by changes in U due to user insertions and deletions. The new security definition 500, shown in FIG. 5, will become relevant for the non-synthetic chaff generation method V3; accordingly, the adversary is refined to always compromise the authentication server.

Likelihood Attacks

Consider any particular chaff set $W_i$ that the adversary A possesses during any of the two security games 300, 500. In the likelihood attack model, as described in Juels and Rivest, A will try to make its final selection by outputting that $z \in W_i$ that maximizes the relative likelihood (of the event) that the user i selects real password x compared to the chaff generator picking x. The arguments of Juels and Rivest are extended to reflect a user-specific distribution for selecting real passwords.

Specifically, the likelihood that c(i)=j, given $W_i = \{w_{i,1}, \ldots w_{i,k}\}$, is equal to $$U_i(w_{i,j}) \prod_{j' \neq j} G(w_{i,j'}),$$

where $U_i(x)$ denotes the probability that user i chooses password x and G(x) denotes the probability that the chaff generation method Gen produces x for inclusion in $W_i$. Thus, this likelihood equals $CR_i(w_{i,j})$, where $C = \prod_j G(w_{i,j'})$ and $R_i(x) = U_i(x)/G(x)$.

Implementing Gen

In order for a chaff generation method to be secure with regard to the security games 300, 500, the chaff generation method must output chaff that is hard to distinguish from a real password of a user. As noted above, Juels and Rivest enumerated three ways to generate synthetic chaff and recommended a hybrid approach leveraging all three as the optimal implementation. The advantage of the hybrid approach is that it produces uncertainty in multiple dimensions for the attacker and essentially creates a layered defense. Even if the attacker is able to break one of the components of chaff generation, the attacker may not be able to break all of them and must still "guess" between the remaining choices.

Juels and Rivest suggest to chaff with "tough nuts". These passwords are long, random strings which once hashed will be hard for the attacker to reverse. This creates uncertainty by partitioning the sweetwords into those whose hashes will be easily broken and those for which hash reversing will be prohibitively difficult. Hashing with tough nuts is indeed a good idea but outside the scope of the present invention and should optionally be applied as suggested in Juels and Rivest.

Base Password Generation

As noted in Juels and Rivest, the chaffing-with-a-password-model is designed to create a set of base passwords used to mask the real password. As chaffing-with-a-password-model is applied first, the suggested method is considered before introducing two rounds of improvements. Chaffing-with-a-password-model is the creation of new passwords that may or may not be related to the real password of the user, referred to herein as base password generation. The algorithm presented in the appendix of Juels and Rivest for chaffing-with-a-password-model builds a base password by sampling from passwords in the given training set as well as from some randomly generated noise. This "frankenword" is then checked against the password complexity policy and returned if acceptable.

Method V0:

In order to evaluate the effectiveness of the V0 generation method, the generation of "tough nuts" was removed from the V0 generation method, as these are outside the scope of the present invention. In addition, the policy of the V0 generation method to ensure passwords were at least 6 characters long and contained characters from 3 of the following 4 categories: English uppercase characters (A-Z), English lowercase characters (a-z), base 10 digits (0-9) and non-alphanumeric (e.g. ,$, #, or %) was modified in order to match the Windows Password Complexity Requirement, as best as possible.

Figure 6A:
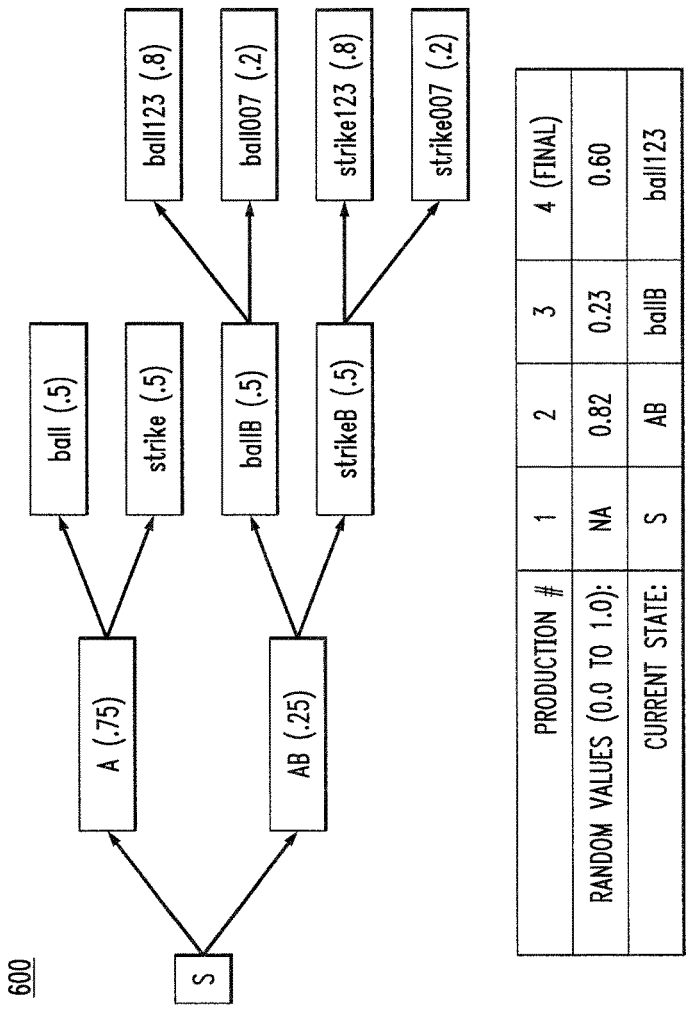
FIG. 6A illustrates an exemplary traversal of a probabilistic context free grammar (PCFG) for the generation of one or more honeywords.

Using PCFGs to Generate Honeywords
Method V1:

It has previously been demonstrated in M. Weir et al. that probabilistic context free grammars (PCFGs) can be effectively used to crack passwords by modeling password creation strategies. An aspect of the present invention recognizes that PCFGs can also be used successfully to generate honeywords. FIG. 6A illustrates an exemplary traversal of a probabilistic context free grammar (PCFG) 600 for the generation of one or more honeywords. In order to generate base passwords at the probability defined by the grammar, one needs to take a random walk through the PCFG 600 weighted by the probability of each production, as shown in FIG. 6A.

The challenge then becomes the design of a grammar to use when generating honeywords. Ideally, while the probabilities and many of the productions will be learned through training on real passwords, the basic grammar structure needs to be designed beforehand. For the V1 generation method, the grammar is based loosely on the PCFG grammar defined in M. Weir et al.

In the preprocessing phase, the grammar is trained on a set of training passwords to identify the probabilities of patterns and habits found in the set. FIG. 6B is a table 650 indicating an exemplary set of string types used by the V1 generation method. As in M. Weir et al., an alpha string (A) represents a sequence of alphabetic symbols, a digit string (D) represents a sequence of digits, and a special or other string (O) represents a sequence of non-alpha and non-digit characters. To this, a keyboard string (K) is added which represents any sequence of four or more adjacent characters on a US keyboard.

The concept of base structures is also applied, which represent the first production from S (start) to a combination of alpha, digit, special and keyboard strings. The base structure also maintains the length information associated with the strings. As an example, if the password strike123! was parsed, its associated base structure would be $A_6D_3O_1$.

The addition of keyboard strings (K) to the table 650 means that the disclosed grammar is no longer unambiguous since it is now possible for the same terminal to be generated multiple different ways (e.g., 1qaz can be produced from both $D_1A_3$ and $K_4$). In the training phase, this is dealt with by giving keyboard strings (K) a higher priority than other productions. While an ambiguous grammar is an issue when cracking passwords, (it could create duplicate guesses and those guesses would not be generated as the sum of their probability), it is not a serious issue when generating honeywords since it is not necessary to output guesses in probability order. Furthermore, the advantages of modeling keyboard strings (K) more than outweigh any potential problems that an ambiguous grammar may cause.

Aspects of the present invention also improve the grammar of M. Weir et al. by including case mangling rules applied to alpha strings. To do this, all alpha strings are parsed, regardless of their base structure, and a mask is extracted representing the capitalization rules used. Probabilities are then assigned to each mask based on the number of occurrences of each mask of length n, for all alpha strings of length n. In the disclosed updated grammar, all alpha strings have productions to associated length case masks at the probability found in the training set. Thus, the case mask is applied upon the creation of terminal guesses and can be viewed as a further refinement of a terminal.

Method V2:

The V2 generation method ties in case masks with the base structures to deal with password complexity requirements. Earlier approacahees often result in terminals that did not meet password complexity requirements. For example, the base structure $L_8D_2$ could be created from the training set by a valid password such as Password12, but the resulting grammar might then generate the honeyword password12 which would not meet the requirement of containing three different character types. Furthermore, an exemplary implementation of the invention does not tie the case masks directly into the base structures, in order to keep the specific capitalizations context free from the rest of the base structure due to the rarity of more obscure case masks.

The V2 generation method employs capitalization strings, represented as C, and redefines alpha strings, A, to be strings that only contain lower-alpha characters. Case masks are only then applied to capitalization strings. Therefore, the base structure of the training password cat$Hat would be $A_3O_1C_3$ with the case mask of $C_3$ being $U_1L_2$. While the resulting grammar can still generate honeywords that do not meet password complexity requirements, for example, PASSWORD12, an uppercase-only string was not introduced in the exemplary embodiment, as that occurrence was sufficiently rare to outweigh the added complexity.

One issue with the V1 generation method is that the training program may miscategorize dictionary words as keyboard strings (e.g., 'dessert'). First, the V2 generation method redefines keyboard strings so they had to contain at least two character types. This addressed many of the issues, but still categorized passwords, such as batter45, as containing the keyboard string "er45". As a workaround, common end-of-word strings such as "er" and "tty" are disqualified.

Another improvement incorporates letter replacements into the grammar. For example, replacing "a" with an "@" in p@ssword. This is accomplished by applying a replacement mask after the case mask for capitalization strings, and after alpha strings, (since they do not have a case mask). A vast majority of these productions do not result in any replacements, because replacements are fairly uncommon in the employed training sets. If a replacement is warranted, the V2 generation method attempts to apply it to the selected dictionary word. If the dictionary word does not have that particular alpha character to replace, then the word is discarded and another random dictionary word is selected. This process is repeated a number of times until a valid dictionary word is found or the predefined number of guesses are tried unsuccessfully, in which case the honeyword is rejected.

In addition, the V2 generation method incorporates several common context sensitive patterns that contained different types of strings into the grammar. For example, a set of exemplary context sensitive patterns comprises "<3", ";p", "#1", "*0*". While the V1 generation method would eventually generate the context sensitive patterns, they would not occur as often as they are seen in the training set. As an example, the V1 generation method would often generate "$1" instead of "#1" since "$" is more common than "#" even though the combination of "#1" is more common than "$1". These combinations are manually specified in the exemplary training program of the V2 generation method. When these sequences are later encountered during training, the probability that they occur is determined. To incorporate the results into the exemplary grammar, a new category is created called context-sensitive string, represented as X in the base structure that would hold these productions. In short, context-sensitive strings are treated in a similar manner as keyboard strings.

In addition, the V2 generation method removes e-mail addresses during the training phase. E-mail addresses were relatively common in the training set as they tend to meet many of the password complexity requirements. Unfortunately, the PCFG does not recreate them well, due to their context sensitive nature. For example, encountering bob1@gmail.com during training might result in generating the honeyword hat1$taxes!cat. Due to the high number of e-mail addresses, this was a noticeable problem.

FIG. 7 is a table 700 illustrating the string types and masks used in the exemplary V2 generation method. In addition, the training set of the V2 generation method is augmented with a source of semantically significant phrases to increase the rate at which base passwords with semantic significance would be created. It has been found that approximately 60% of passwords can be identified as containing semantic meaning. Defining semantic meaning programmatically is difficult, but by providing more semantically rich samples to the PCFG, more semantically rich passwords can be generated.

The source of this additional training set in the exemplary V2 generation method is Twitter hashtags. Hashtags have a number of desirable properties, including the fact that they are timely, typically short, and full of semantic meaning. Hashtags were collected over the period of a couple of days, filtered, and the remaining set was used as a second input dictionary to the PCFG.

Tweaking

After generating a number of base passwords, the hybrid approach of Juels and Rivest suggests applying chaffing by tweaking. If base password generation is thought of as one dimension or layer in our defense strategy, tweaking is another (with "tough nuts" being a third). Once a set of base passwords is established, including the real password, all of the passwords are then tweaked, modifying pieces of the password to create derivative honeywords.

Method V0:

Juels and Rivest recommend chaffing-by-tweaking digits; randomly replacing the last t occurrences of a digit within the base password. For a password policy that does not ensure the password contains digits, the requirement can be modified to tweak either digits or symbols, with preference given to the former. In addition, when the number of digits or symbols in the password is not controlled (only one of either, combined with an uppercase and lowercase letter would meet the policy), t>1 cannot be specified. Instead, all groups of digits or symbols are identified and a random replacement is performed on the last group of digits, replacing symbols only if no digits were present in the base password.

In other words, a password is parsed using the string types specified by the PCFG parser and a random digit replacement is generated for the last D string, instead replacing O strings when necessary; ball123→$A_4D_3$→ball582, Cat4!→$A_3D_1O_1$→Cat2!, Strike!→$A_6O_1$→Strike#. This method is flexible in that it replaces as many consecutive digits (or symbols) as possible yet works on all passwords that meet our complexity requirements.

Figure 8:
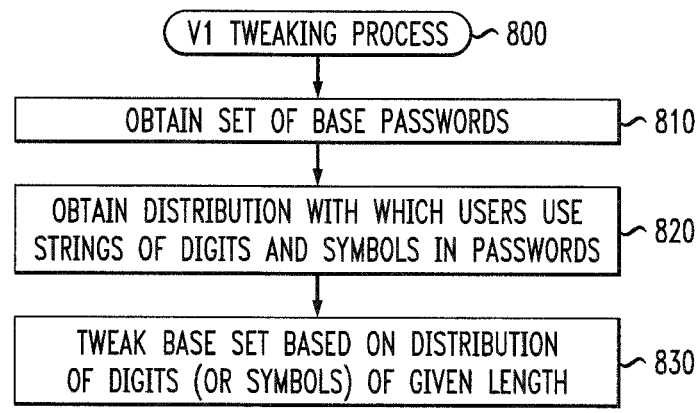
FIG. 8 is a flow chart illustrating an exemplary implementation of a V1 tweaking process incorporating aspects of the present invention.

Method V1:

FIG. 8 is a flow chart illustrating an exemplary implementation of a V1 tweaking process 800 incorporating aspects of the present invention. The distribution with which users select numbers and symbols is far from uniform. In fact, these distributions are computed and used by the PCFG base-honeyword generator, which is leveraged for tweaking as well.

As shown in FIG. 8, the exemplary V1 tweaking process 800 initially obtains a set of base passwords during step 810, including the real password. In addition, the exemplary V1 tweaking process 800 initially obtains a distribution with which users use each possible string of digits of a given length and each possible string of symbols of a given length in passwords during step 820. For example, the distribution may be approximated from the employed password model or obtained from a frequency analysis over a password database, such as the RockYou database. Generally, for a particular string of digits (or symbols) of a given length, the distribution indicates the probability that the particular string is used by users in passwords.

The passwords in the base set are then tweaked during step 830 to modify pieces of the password to create derivative honeywords. The obtained base set is tweaked during step 830 based on the obtained distribution of digits (or symbols) of a given length. In this manner, when a set of digits is to be replaced, the distribution of digits of the given length is sampled for the replacement, ensuring a replacement chooses a different set of digits than the previous choice. Sets of symbols are handled in a similar manner.

While the V0 generation method prefers digit replacement, it is quite common that the digit string is the one containing semantic meaning (e.g., Matchbox-20 and Matchbox_20 have similar semantic meaning and are both more probable than Matchbox-11). All D and O strings are enumerated in a base password, randomly picking one such string to tweak. To preserve "flatness", that choice persists for as many tweaks as desired (once picked, the same position will be replaced by every tweak).

Much more complicated tweaking strategies are possible, and in fact may become necessary. If a digit string of length 1 is selected, only 9 possible tweaks exist (the 10th being consumed by the base password). In many systems, it may make sense to sample from a much larger tweak space (e.g., administrator password). This could be accomplished, for example, by randomly tweaking all "tweakable" positions with some probability, or disallowing passwords that are not sufficiently tweakable (or likely both). The distribution from which replacements are selected should not bias the tweak generation too much. The exemplary V1 tweaking process 800 samples from the distribution without replacement, and the user is allowed to make the first selection. Assuming that the user selects with the same probability distribution used for tweaking, then the most common tweak is more likely to appear in the base password than in the tweaks.

Method V2:

While the exemplary V1 tweaking process 800 more closely matches the distribution with which users use digits and/or symbols, it ignores the semantic meaning that such use conveys. There are numerous cases where the semantic meaning makes the choice of password obvious (e.g. #1Stunna vs. $3Stunna).

Figure 9:
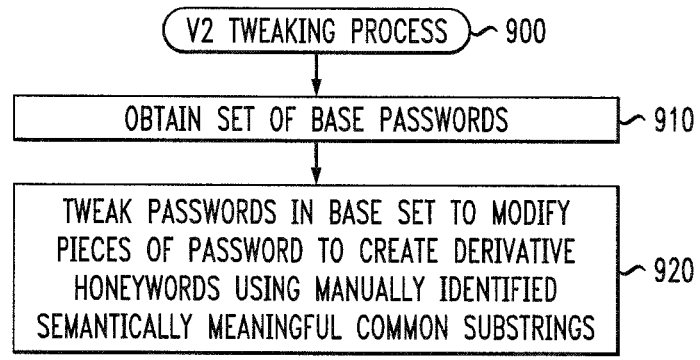
FIG. 9 is a flow chart illustrating an exemplary implementation of an exemplary V2 tweaking process incorporating aspects of the present invention.

FIG. 9 is a flow chart illustrating an exemplary implementation of an exemplary V2 tweaking process 900 incorporating aspects of the present invention. The exemplary V2 tweaking process 900 addresses a number of cases where meaning is obvious. As shown in FIG. 9, the exemplary V2 tweaking process 900 initially obtains a set of base passwords during step 910, including the real password. The passwords in the base set are then tweaked during step 920 to modify pieces of the password to create derivative honeywords using manually identified semantically meaningful common substrings.

For example, email addresses are commonly used as passwords since they meet most complexity requirements. Tweaking by replacing symbols (like '@' or '.') breaks the inherent structure of the email address and makes the job of the attacker easier. To combat this, the exemplary V2 tweaking process 900 identifies email addresses during step 920 and instead of tweaking the email addresses by replacing symbols and/or digits, the exemplary V2 tweaking process 900 instead replaces the mail domain with another valid choice. For example, if the base password were john.doe@gmail.com, instead of creating john.doe(gmail- .com as the original algorithm might, the exemplary V2 tweaking process 900 instead generates john.doe@aol.com. This too is done relative to the measured distribution seen on email addresses in the training set.

There are many other corner cases like this that can be identified and programatically detected. Doing so has the potential to help further lower the attackers guessing probability by preserving semantic meaning when possible. For example, dates, such as Feb. 14, 2020, can be handled specially to maintain semantic meaning. For example, dates can be processed to ensure proper formatting and reasonable dates (i.e., no month 15, for example).

As noted above, another aspect of the invention employs an attack algorithm comprising a classifier based on a character (n-gram) based language model to evaluate whether the honeywords generated by any generation method, such as the V0-V3 generation methods described herein, are distinguishable from real passwords.

Figure 10:
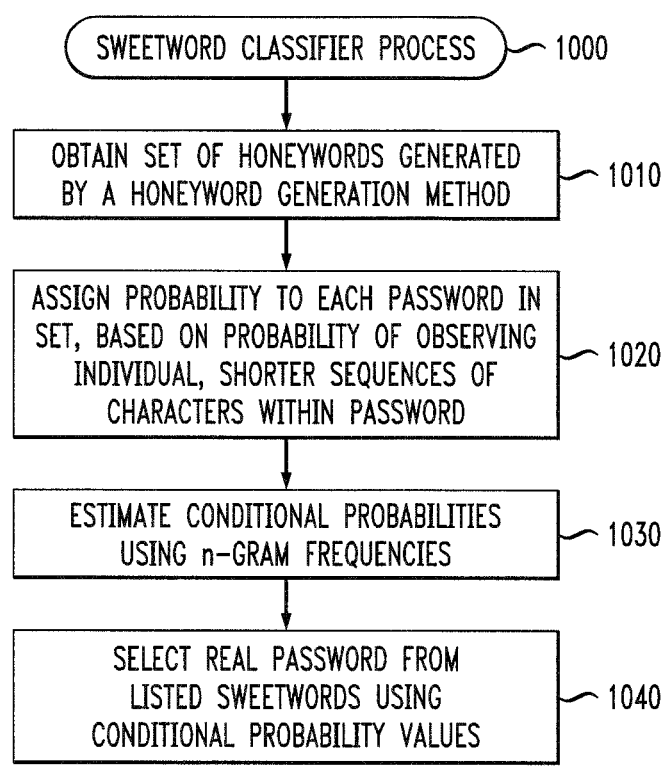
FIG. 10 is a flow chart illustrating an exemplary implementation of a sweetword classifier process incorporating aspects of the present invention.

FIG. 10 is a flow chart illustrating an exemplary implementation of a sweetword classifier process 1000 incorporating aspects of the present invention. The exemplary sweetword classifier process 1000 outputs the probability of each password from among the listed sweetwords in a given question using a character-based language model. The exemplary sweetword classifier process 1000 initially obtains a set of honeywords generated by a honeyword generation method during step 1010. The model assigns a probability to a particular password in the set during step 1020, based on the probability of observing the individual, shorter sequences of characters within the password. The term n-grams refers to these sequences of n individual characters. In the exemplary n-gram model, the probability $P(c_1, \ldots, c_m)$ of observing the password $c_1, c_2, \ldots c_m$ is defined as $$P(c_1, \ldots, c_m) = \prod_{i=1}^{m} P(c_i \mid c_1, \ldots, c_{i-1})$$

$$\approx \prod_{i=1}^{m} P(c_i \mid c_{i-(n-1)}, \ldots, c_{i-1}),$$

where it is assumed that the probability of observing the character $c_i$ is approximated by the probability of observing c, given the preceding n−1 characters. In other words, an n-th order Markov model is assumed. In one exemplary implementation, n=5, which means that the probability of observing particular sequences of 5 characters in a set of human created passwords are examined. The filtered RockYou dataset provided for training, which included more than 600,000 passwords, was used to estimate the probabilities.

The conditional probability values are estimated during step 1030 using the frequency of these n-grams, together with Laplacian smoothing to handle the cases of unseen n-grams $$P(c_i \mid c_{i-(n-1)}, \ldots, c_{i-1}) = \frac{cnt(c_{i-(n-1)}, \ldots, c_{i-1}, c_i) + 1}{cnt(c_{i-(n-1)}, \ldots, c_{i-1}) + |V|^n},$$

where |V| is the size of the alphabet from which the user can create the password.

Finally, the exemplary sweetword classifier process 1000 outputs the probability of each password from among the listed sweetwords during step 1040 using the conditional probability values. This probability ordering can be used to measure the effectiveness of honeyword generation.

Non-Synthetic Honeywords

As noted above, another aspect of the invention provides a non-synthetic honeyword generation method, referred to as the V3 generation method. As discussed hereinafter, the V3 generation method recognizes that for a given user in a system, the real passwords of other users can be employed as honeywords for the given user. In this manner, the honeywords will originate from the same distribution as real passwords. While password additions and deletions potentially reveal critical information to an adversary that compromises a password file multiple times, the V3 generation method addresses this issue with techniques that batch password changes.

The non-synthetic honeyword generation method $Gen_{NonSyn}$ is based on the use of passwords of other users for producing honeywords for a given user. Consider a standard user authentication system AS for a set of N users U, where for each user $u_i \in U$, the authentication server stores password $p_i$. Let P denote the set of passwords of N user, i.e., $P=\{(p_1, p_2, \ldots, p_N\}$. Generally, the non-synthetic honeyword generation method $Gen_{NonSyn}$ extends a standard authentication system into a chaff-based one where the set of honeywords for any user is formed simply as a subset of k−1 real passwords randomly selected from set P.

The merits of such a chaff-generation method are twofold: First, such a system should enjoy performance efficiencies, as honeywords are essentially (pre)computed for free and no additional storage is required, other than an indexing structure for linking passwords together to form chaff sets. Second, and perhaps more important, such a system would naturally make use of semantically rich honeywords, thus significantly reducing the possibility of an attacker identifying the real password of a victim user solely based on the fact that synthetically produced honeywords may fail to carry semantic contents.

On the other hand, such a non-synthetic chaff generation method mixes multiple real password generation distributions, say $U_{j_1}, U_{j_2}, \ldots, U_{j_{k-1}}$, with the user $u_i$'s real distribution $U_i$. Therefore, should any such distribution $U_{j_1}$ or $U_i$ be so user specific that it produces passwords that are related to publicly known characteristics of the corresponding user, this would naturally create a distinguishing advantage for an attack. For instance, assume that $U_i$ is very user specific in that it assigns significant probabilities to passwords that contain the user $u_i$'s login name, whereas at the same time the other user's distributions $U_{j_1}$ are much less user specific according to this criterion, thus assigning very low probabilities to such weak passwords. In this case, purely non-synthetic chaff sets may be susceptible to distinguishing attacks. Another negative characteristic of such a method of using other users' passwords as honeywords, is that if the attacker compromises the authentication server it also learns a converse relation mapping each password to a set of possible users having this password as real. Again, depending on the users' real-password generation distributions $U_j$, this may provide an attacker with a significant distinguishing advantage.

However, as discussed below, the exemplary non-synthetic chaff generation method may be hybridized by employing the synthetic base password selection and tweaking techniques described herein to provide stronger security. Introducing tweaked and semantically-rich synthetic honeywords generally help remedy some of the problems mentioned above. Thus, depending on the setting, this approach may add extra security to the honeywords framework.

It is thus possible that, within a given population of users $U=\{u_1, \ldots, u_m\}$, the password of one user can be used as a chaff value for other users. Such arrangements may be referred to herein as "cross-user chaff." Let $P=\{p_1, \ldots, p_m\}$ denote the passwords associated with users in U, where $p_i$ is the password of user $u_i$. It should be noted that the variables m and i are used in a different sense in this context than in other contexts herein. A given user $u_i$ is assigned a subset of values in $P-\{p_i\}$ as chaff values. This assignment may be represented as a bipartite graph G in which each element of U is represented by a node on the left and each element of P by a node on the right. An edge $(u_i, p_j)$ of the bipartite graph G then denotes assignment of a password $p_j$ as a chaff value to the user $u_i$. The degree of $u_i$ denotes the size of the corresponding chaff set including the valid password for that user.

The bipartite graph G in this example serves as a convenient conceptual or operational representation of chaff sets. In order to render valid password edges of the form $(u_i, p_i)$ indistinguishable from chaff edges, it suffices to randomize the order of the nodes in P.

The above-described cross-user chaff example implicitly sets the chaff lexicon from which chaff passwords are selected to be the set P of deployed passwords.

This approach has the benefit of rendering chaff indistinguishable from valid passwords for an attacker with a priori knowledge about a given population of users. However, it does not render chaff indistinguishable for an attacker with a priori knowledge about sub-populations. For example, in a multinational corporation, users in one country may select passwords with a different linguistic basis than those in another. It may therefore be helpful to generate separate bipartite graphs for sub-populations of similar users. Sub-populations may be determined according to any of a range of demographic criteria, including native language, country of employment, function within an organization, etc.

As an alternative approach, it is possible to bias selection of the chaff associated with a given user toward users within the same sub-population. It is also possible to bias selection in this way with respect to more than one partitioning of a population. For example, a chaff-selection policy might require that every user have one chaff password drawn from another user based within the same country and another chaff password drawn from another user within the same functional group of the user's organization.

Scheme Description

Let AS be an authentication system of a set of users $U=\{u_1, u_2, \ldots, u_N\}$. The authentication server stores a unique password $p_i$ for each user $u_i$ in U. Let $P=(p_1, p_2, \ldots, p_N)$ denote the set of passwords corresponding to the users set U. System AS allows for users' deletions and insertions in the set U: In general, for any new user u' that is added in set U of AS, a corresponding new password p' is added in P, and similarly deletion of an existing user from U results in deleting the corresponding password from P. Users may additionally change their password.

The chaff-based extension of AS is considered by defining a chaff-generation method $Gen_{NonSyn}$ so that for each user $u_i \in U$ a corresponding chaff set $W_i$ and a correct index c(i) are defined so that $w_{i,c(i)} = p_i$. In an exemplary static case, U is fixed to contain N different users. An associated indexing structure S is defined that relates sets U and P to each other so that chaff sets $W_1, W_2, \ldots, W_N$ are implicitly well-defined via S, U and P. The authentication server stores an indexing structure "file," S=S(U,P) from which the following sets can be derived:

1. the set $W=\{(1,W_1),(2,W_2), \ldots, (N,W_N))\}$ of indexed chaff sets;
2. the set of users U; and
3. the set of passwords P.

Important for the security of the system, the set of correct indices $\{(1,c(1)),(2,c(2)), \ldots, (N,c(n)))\}$ cannot be derived by S=S(U,P).

The system AS can update its chaff-set configuration to adjust to a new set of users U' that has resulted from some user updates that are performed in a batch. That is, a model is optionally adopted for performing system updates where time is divided into epochs of fixed duration, and where at the beginning of a new epoch t the old users set $U_{t-1}$ is updated to a new set $U_t$, the corresponding set of passwords is updated from $P_{t-1}$ to $P_t$ and, accordingly, the associated structure is updated from $S_{t-1}$ to $S_t$.

Static Case.

Generally, S is essentially a randomized bidirectional bipartite graph G(V,V',E) encoding password membership into chaff sets as follows:

Set of nodes V, |V|=N is in one-to-one correspondence with a fixed ordering of the users' set U. That is, if U is ordered as $U=(u_1,u_2, \ldots, u_N)$, then $v_i \in V$ represents user i in the system. $v_i$ and $u_i$ are used interchangeably.

Set of nodes V', |V'|=N is in one-to-one correspondence with a (secret) random permutation π (defined over set P of size N) of a fixed ordering of the password set P. That is, if P is ordered as $P=(p_1, p_2, \ldots, p_N)$ and permuted according to permutation π into set $\pi(P)=(p_{\pi(1)},p_{\pi(2)},\ldots p_{\pi(N)})$, then $v_j'\in V'$ represents password $p_{\pi^{-1}(j)}$ in the system. Equivalently, node $v_{\pi(j)}'\in V'$ stores password $p_j$. $v_j'$ and $p_{\pi(j)}$ are used interchangeably (equivalently $v_{\pi(j)}'$ and $p_j$).

Set of edges E are bidirectional and link users to passwords and vice versa, according to the containment of passwords in the chaff sets:

It holds that $(v_i, v_{\pi(j)}')\in E$ if and only if $p_j \in W_i$, that is, the password $p_j$ is included in the chaff set of user $u_i$ if and only if there is a link connecting node $v_{\pi(j)}'$ to node $v_i$.

Given such a structure S, the following sets are defined:

1. Chaff Set: For any $v_i\in V$, $W(v_i)$ or $W_i$ is the set of nodes in V' to which $v_i$ is connected, i.e., $W_i=\{(p_j|(v_i,v_{\pi(j)}'))\in E\}$, the chaff set of user $u_i$.

2. Support Set: For any $v_j'\in V'$, $S(v_j')$ or $S_j$ is the set of nodes in V to which $v_j'$ is connected, i.e., $S_j=(u_i|(v_i,v_j')\in E)$, the support set of password $p_{\pi^{-1}(j)}$.

FIG. 11 provides exemplary pseudo code for an exemplary static implementation 1100 of a non-synthetic chaff generation method $Gen_{NonSyn}$ incorporating aspects of the present invention. As shown in FIG. 11, the exemplary static implementation 1100 of the non-synthetic chaff generation method $Gen_{NonSyn}$ receives an input comprised of a parameter k (the size of the chaff sets), a set of users U and a set of passwords P, where P is ordered to be in one-to-one correct correspondence with a fixed ordering of U. In other words, $U=(u_1,u_2, \ldots, u_N)$, $P=(p_1,p_2, \ldots, p_N)$ and $p_i$ is the password of user $u_i$.

During an initialization step, an empty (disconnected) bipartite graph G(V,V',E), where E=0, is initialized. During a real-password inclusion step, for any user $u_i \in U$, edge($v_i$, $v_{\pi(i)}'$) is included in E.

During a random chaffing step, for any user $u_i \in U$, a random set of k-1 edges $E_i=\{(v_i,v_{\pi(j)}')|j\in I_i\}$ where set of indices $I_i$ is formed by randomly selecting without repetition k-1 elements from set [1:N]−{i}. Finally, the set of correct indices $I=\{(i,\pi(i))|ui\in U\}$ are ouput.

It is important to associate the passwords to the set of nodes V' in a permuted manner (through secret random permutation π): The use of permuted stored passwords P along with the random selection of the chaff passwords ensure that the $Gen_{NonSyn}$ method is location oblivious, as discussed above. In addition, this location obliviousness will facilitate the security of the dynamic extension of $Gen_{NonSyn}$, discussed below.

Dynamic Case.

The exemplary static implementation 1100 of the non-synthetic chaff generation method $Gen_{NonSyn}$ can be extented for the case where users are updated in the system. In the case of a single user insertion in the system at (the beginning of) epoch t, an exemplary precondition is that for the new epoch t another at least k-1 other users are scheduled to change their password. This precondition can be relaxed by using synthetic passwords, as discussed below. Similarly, an extension of this scheme will be discussed to handle any set of scheduled password updates in the system.

FIG. 12 provides exemplary pseudo code for an exemplary dynamic implementation 1200 of a non-synthetic chaff generation method $Gen_{NonSyn}$ incorporating aspects of the present invention. As shown in FIG. 12, the exemplary dynamic implementation 1200 of the non-synthetic chaff generation method $Gen_{NonSyn}$ comprises the following:

1. Input: A new epoch t, a new user record (N+1, $u_{N+1},p_{N+1}$), k−1 user new records $R=(\ell_1,u_{\ell_1},p\ell_1', \ldots, \ell_{k-1},u_{\ell_{k-1}},p\ell_{k-1}'))$, $\ell_1<\ldots \ell_{k-1}$, and their corresponding correct indices $C=((\ell_1, c(\ell_1)), \ldots, \ell_{k-1}c(\ell_{k-1})))$.

2) Graph update: Update $U_{t-1}=(u_1,u_2,\ldots, u_N)$ with new users set $U_t=(u_1,u_2,\ldots, u_N,u_{N-i})$, where $u_{N+1}$ is the new user that is inserted in the system. Update $P_{t-1}=(p_1, p_2, \ldots, p_N)$ with new password set $P_t=(p_1,p_2, \ldots, p_N,p_{N+1})$, where $p_{N+1}$ is the password of the new user $u_{N+1}$. Update $S_{t-1}$ to St as follows:

a) User's addition: $V_{t-1}$ is updated to $V_t=V_{t-1}\cup(v_{N+1})$, where $v_{N+1}$ is a new node associated with new user $u_{N+1}$.

b) Password addition: $V'_{t-1}$ is updated to (intermediate set of nodes) $\bar{V}_t'=V'_{t-1}\cup\{v'_{N+1}\}$, where $v'_{N-1}$ is a new node associated with the password $p_{N+1}$.

c) Passwords replacement: For any index (existing user) $j\in\{\ell_1, \ell_2, \ldots, \ell_{k-1}\}$, delete the old password $p_j$ associated with node $v''_{c(j)}\in\bar{V}'$ and replace it with new password $p'_j$.

d) New chaffset: Add edge $(v_{N+1}, v'_{N+1})$ and edges $\{(v_{N+1}, v'_{c(j)})|j\in\{\ell_1, \ell_2, \ldots, \ell_{k-1}\}\}$ into $E_{t-1}$.

e) Chaff correction: For each $j\in=(\ell_1, \ell_2, \ldots, \ell_{k-1})$, randomly select an element $v_1$ from the support set $S_{c(j)}$ of $p'_j$ satisfying that $(v_1,v'_{N+1})\notin E_{t-1}$, remove edge $(v_1, v'_{c(j)})$ from $E_{t-1}$ and add edge $(v_1,v'_{N+1})$ into $E_{t-1}$. Set $E_t=E_{t-1}$. (If no such $v_1$ is found after a fixed number of attempts, abort with Fail.)

3) Re-randomization: Randomly select a permutation $\rho_t$ (defined over a set of size k), set $\ell_i=c(\ell_1), i\in[\ell_i:k-1]$, as well as $l_k=N+1$, and transform graph $G(V_t,\bar{V}_t',E_t)$ into isomorphic graph $G(V_t,\bar{V}_t',E_t)$ imposed by the following edge-preserving bijection defined over nodes in $\bar{V}_t'$:

node $v'_j\in\bar{V}_t'$, is mapped to node $v'_{f(j)}\in V'_t$, where f(j)=$1_{\rho_t(i)}$ if j=$1_i$, i∈[1:k], or f(j)=j otherwise.

4) Output: Update the set of correct indices $I_{t-1}$ to set $I_t$ by replacing the indices for updated users $\ell_1, \ell_2, \ldots,$ and N+1 with new indices $(\ell_1,\rho e_1,(c(\ell_1))), \ldots, (\ell_{k-1},\rho_t(c(\ell_{k-1})))$ and (N+1,$\rho_t$(N+1)), respectively.

Generally, the exemplary dynamic implementation 1200 of the non-synthetic chaff generation method $Gen_{NonSyn}$ appends the new user-password pair in the system's file S (as a pair of new nodes added at the "bottom" of the bipartite graph), and the k−1 new (changed) passwords replaces the corresponding old ones. Then, the new password, conveniently, along with the k−1 renewed passwords are used to form the new users' chaff set. To complete the update, however, two additionally corrective steps are performed: (1) The new password is included in the chaff sets of randomly selected users for the support sets of the replaced passwords; and (2) The k new passwords are randomly permuted, that is, their associated host nodes of the bipartite graph mutually change positions in an unpredictable but edge preserving way).

It is noted that attention should be paid so that no multi-edges are introduced in the graph (linking more than once a user-password pair). In a real instantiation of the scheme with large values of N this will only occur with very low probability, but for correctness this "failure" outcome is allowed, where the user's insertion need to be rescheduled in one of the next time epochs.

The following principles allow the use of other users' passwords as a chaffing method without introducing additional attack vectors. First, passwords should be stored and updated in a permuted form, so that no association can be derived between their actual location in the file $S_t$ and their true owner. Note, for instance, that appending new users' passwords (even randomly permuted) at the end of the file may introduce a type of a "partition" attack, where the attacker can reduce the search space of the owner of a particular set of passwords by exploiting their position in the file.

Second, new passwords should be chaffed only with new or changed (renewed) passwords, or otherwise certain "filtering" attacks may be introduced: For instance, assuming that passwords in $P_t$ are distinct, if $p_j$ is a password in $S_t$, and $p_j \in W_i$ where $W_i$ is a new chaff set in $S_{t+1}$, then $p_j$ is more likely to be a honeyword in $W_i$.

Third, attention should be paid so that an existing chaff set always changes its "link structure," according to bipartite graph, in a way that is "isomorphic," i.e., it does not introduce any "intersection" attack. For instance, suppose that chaff set $W_i$ in $S_t$ changes to $W_i'$ in $S_{t-1}$ and only one link changes: $p_j$ leaves the chaff set and $p_{j'}$ joins the chaff set; then if $p_j$ does not change in $S_{t+1}$, then the real password of user i in $S_{t+1}$ must belong in $W_i \cup W_i'$, under the assumption that passwords in P are distinct.

The disclosed exemplary static and dynamic non-synthetic chaff-generation methods 1100, 1200, discussed above in conjunction with FIGS. 11 and 12, conform with the above design principles. In addition, the exemplary dynamic method 1200 maintains the invariant that any user is linked to exactly k passwords and any password on average is linked to O(k) users, so that over time the bipartite graph does not degenerate into an unbalanced one.

Deletion.

Handling user deletions can be trickier than user insertions, as their passwords are being used as honeywords by O(k) other users on average, therefore, deletion of them may lead to certain intersection attacks as the one presented above. Instead, a scheme is proposed where user deletions occur in a lazy fashion: Users (and not their real passwords) are marked as deleted and then deleted users and their corresponding passwords are deleted in batch after many time epochs. In practice, keeping deleted users in the system is not a problem: It is the case in many existing systems that deleted users' (e.g., old employees') accounts are maintained, often permanently.

Distinct Passwords.

The sampling behind the chaff construction method is optionally processed so that a chaff set never contains two or more same passwords.

Employing Synthetic Passwords and Tweaking.

In one exemplary embodiment, the dynamic scheme discussed above is hybridized by allowing the use of synthetic passwords in the node set V". (Maintaining corresponding fake users is also an option.) That is, additional synthetic passwords can be treated as "new or renewed passwords," (under the restriction that synthetic passwords replace only synthetic ones) thus facilitating meeting the pre-condition requirement, namely, that for each new user in the system there exist exactly k−1 users in the system that change their password. In the present case, these k−1 such passwords may be a mix of real passwords and synthetic ones. Additionally, a tweaking method can be applied so that both real password and synthetic ones are tweaked, say to form another l=2 tweaked versions of these passwords. To avoid intersection attacks, though, these tweaked passwords are consistently included in chaff sets generation: That is, the original (real and synthetic) base passwords along their l tweaked ones are viewed as forming clusters of size l; then ensure that passwords are included in chaff sets in clusters.

Interestingly, the hybrid scheme where both synthetic and non-synthetic passwords are used strictly improve the security of the scheme: An attacker may at best eliminate the benefits provided by one or both mechanisms but cannot use a possible weakness of one to create a new weakness of the other. In the worst case, the security is reduced to the security level provided by the strongest of the two methods.

Various aspects of the present invention recognize that offering better anti-breach protections against user-impersonation attacks due to leakage of password files, decoy passwords, or honeywords, provides an additional layer of defense. In addition to cracking the potentially hashed passwords, attackers must now also identify the "real" password from among a set of fake, distracter, passwords.

The various embodiments described herein extend the existing design and analysis frameworks for honeywords across several dimensions, including: (1) modeling the underlying security problem in richer adversarial settings that allow targeted attacks and continuous leakage of password records; (2) proposing enhancements of the existing "model and tweak" design principle, repurposing a password-cracking algorithm to operate "in reverse," and further alter produced decoys via carefully chosen substring replacements; (3) presenting further refinements for producing and processing decoys in a way that enrich and preserve their semantic relevance; and (4) introducing a new method for generating non-synthetic decoys for a user by carefully employing real passwords of other users (thus ensuring even higher semantic relevance).

It should be appreciated that the particular features of the described two-server embodiments above are presented by way of example only, and other embodiments need not incorporate these features. The foregoing embodiments should be considered as illustrative only, and numerous other embodiments can be configured using the techniques disclosed herein, in a wide variety of different authentication applications. For example, as indicated previously, techniques described in the context of two servers can be extended in a straightforward manner to a different number of servers.

It should also be understood that verification functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "processor-readable storage medium."

The embodiments described in conjunction with FIGS. 1 and 2 can provide a number of significant advantages relative to conventional practice. For example, these embodiments exhibit significantly enhanced security relative to conventional arrangements in which multiple valid passwords are stored together in a single location, such as in a hashed password file or a password vault.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 13:
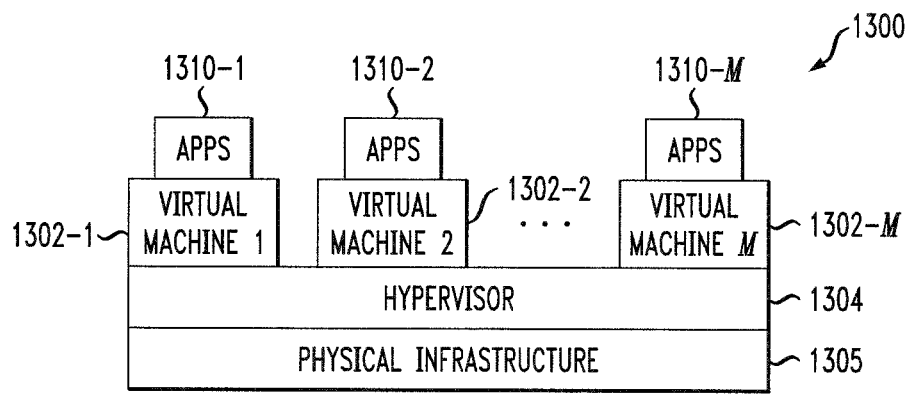
FIGS. 13 and 14 illustrate examples of processing platforms that may be utilized to implement at least a portion of the communication system of FIG. 1.

Referring now to FIG. 13, one possible processing platform that may be used to implement at least a portion of one or more embodiments of the invention comprises cloud infrastructure 1300. The cloud infrastructure 1300 in this exemplary processing platform comprises virtual machines (VMs) 1302-1, 1302-2, . . . 1302-M implemented using a hypervisor 1304. The hypervisor 1304 runs on physical infrastructure 1305. The cloud infrastructure 1300 further comprises sets of applications 1310-1, 1310-2, . . . 1310-M running on respective ones of the virtual machines 1302-1, 1302-2, . . . 1302-M under the control of the hypervisor 1304.

The cloud infrastructure 1300 may encompass the entire system 100 or only portions of that system, such as one or more of the user devices, servers, controllers or protected resources in the system 100.

Although only a single hypervisor 1304 is shown in the embodiment of FIG. 13, the system 100 may of course include multiple hypervisors each providing a set of virtual machines using at least one underlying physical machine.

An example of a commercially available hypervisor platform that may be used to implement hypervisor 1304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of system 100.

Figure 14:
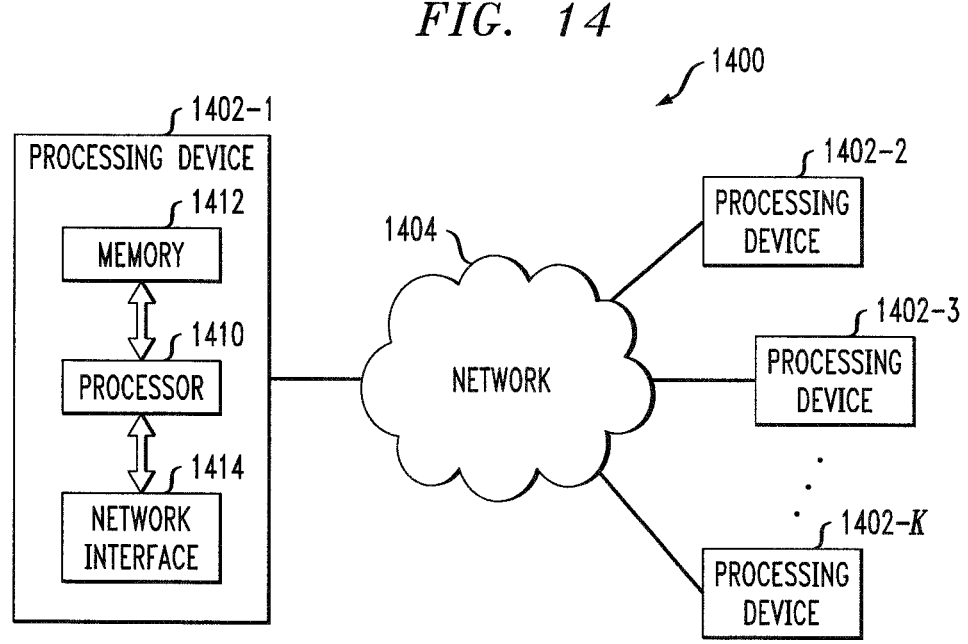

Another example of a processing platform is processing platform 1400 shown in FIG. 14. The processing platform 1400 in this embodiment comprises at least a portion of the system 100 and includes a plurality of processing devices, denoted 1402-1, 1402-2, 1402-3, . . . 1402-K, which communicate with one another over a network 1404. The network 1404 may comprise any type of network, such as a WAN, a LAN, a satellite network, a telephone or cable network, a cellular network, a wireless network such as WiFi or WiMAX, or various portions or combinations of these and other types of networks.

The processing device 1402-1 in the processing platform 1400 comprises a processor 1410 coupled to a memory 1412. The processor 1410 may comprise a microprocessor, a microcontroller, an ASIC, an FPGA or other type of processing circuitry, as well as portions or combinations of such circuitry elements, and the memory 1412, which may be viewed as an example of a "processor-readable storage medium" having executable computer program code or other software programs embodied therein, may comprise RAM, ROM or other types of memory, in any combination.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 13 or 14, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from improved password security as disclosed herein. Also, the particular configuration of communication system and processing device elements shown in FIGS. 1 and 13-14, and the associated verification and password set generation techniques, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A method comprising the steps of:
    obtaining a plurality of base passwords;
    obtaining a distribution with which at least one of particular strings of digits and particular strings of symbols appear in user passwords, wherein said strings have a length of at least one, wherein the distribution indicates a probability that each of a plurality of different strings of characters appear in user passwords; and
    generating, using at least one processing device, a chaff set of passwords by modifying portions of said base passwords based on said distribution, wherein the steps are performed by at least one processing device.

2. The method of claim 1, wherein the distribution indicates the probability that at least one of each possible string of digits of a given length and each possible string of symbols of a given length are used by users in passwords.

3. The method of claim 1, wherein the distribution is one or more of approximated from a password model and obtained from a frequency analysis over a password database.

4. The method of claim 1, wherein the portions of said base passwords are modified by replacing one or more of a string of digits of a given length and a string of symbols of a given length based on said distribution.

5. The method of claim 1, wherein digit portions of said base passwords are modified to retain semantic meaning of said base passwords.

6. The method of claim 1, wherein the portions of said base passwords are modified based on manually identified common substrings of semantic significance.

7. The method of claim 6, wherein the manually identified common substrings of semantic significance comprise an email domain portion, and wherein said email domain portion is modified to generate said chaff set of passwords.

8. The method of claim 1, further comprising the step of deleting duplicate passwords from said chaff set of said given user.

9. An article of manufacture comprising a processor-readable storage medium having embodied therein one or more software programs, wherein the one or more software programs when executed by said at least one processing device cause the method of claim 1 to be performed.

10. An apparatus comprising:
at least one processing device comprising a processor coupled to a memory;
wherein said at least one processing device is configured to perform the following steps:
obtaining a plurality of base passwords;
obtaining a distribution with which at least one of particular strings of digits and particular strings of symbols appear in user passwords, wherein said strings have a length of at least one, wherein the distribution indicates a probability that each of a plurality of different strings of characters appear in user passwords; and
generating, using said at least one processing device, a chaff set of passwords by modifying portions of said base passwords based on said distribution, wherein the steps are performed by at least one processing device.

11. The apparatus of claim 10, wherein the distribution indicates the probability that at least one of each possible string of digits of a given length and each possible string of symbols of a given length are used by users in passwords.

12. The apparatus of claim 10, wherein the distribution is one or more of approximated from a password model and obtained from a frequency analysis over a password database.

13. The apparatus of claim 10, wherein the portions of said base passwords are modified by replacing one or more of a string of digits of a given length and a string of symbols of a given length based on said distribution.

14. The apparatus of claim 10, wherein digit portions of said base passwords are modified to retain semantic meaning of said base passwords.

15. The apparatus of claim 10, wherein the portions of said base passwords are modified based on manually identified common substrings of semantic significance.

16. The apparatus of claim 15, wherein the manually identified common substrings of semantic significance comprise an email domain portion, and wherein said email domain portion is modified to generate said chaff set of passwords.

17. The apparatus of claim 10, further comprising the step of deleting duplicate passwords from said chaff set of said given user.

18. A method comprising the steps of:
obtaining a chaff set of passwords generated by a chaff generation method; and
generating, using at least one processing device, a location oblivious chaff set of passwords by applying a random permutation $\pi$ over one or more elements of said obtained chaff set of passwords, wherein the location oblivious chaff set of passwords positions a real password of a user in a random position among a plurality of chaff passwords in the obtained chaff set of passwords, wherein the steps are performed by at least one processing device.

19. An article of manufacture comprising a processor-readable storage medium having embodied therein one or more software programs, wherein the one or more software programs when executed by said at least one processing device cause the method of claim 18 to be performed.

20. An apparatus comprising:
at least one processing device comprising a processor coupled to a memory;
wherein said at least one processing device is configured to perform the following steps:
obtaining a chaff set of passwords generated by a chaff generation method; and
generating, using said at least one processing device, a location oblivious chaff set of passwords by applying a random permutation $\pi$ over one or more elements of said obtained chaff set of passwords, wherein the location oblivious chaff set of passwords positions a real password of a user in a random position among a plurality of chaff passwords in the obtained chaff set of passwords, wherein the steps are performed by at least one processing device.

* * * * *